United States Patent
Besenbruch et al.

(10) Patent No.: US 11,881,003 B2
(45) Date of Patent: Jan. 23, 2024

(54) IMAGE COMPRESSION AND DECODING, VIDEO COMPRESSION AND DECODING: TRAINING METHODS AND TRAINING SYSTEMS

(71) Applicant: DEEP RENDER LTD, London (GB)

(72) Inventors: Chri Besenbruch, London (GB); Ciro Cursio, London (GB); Christopher Finlay, London (GB); Vira Koshkina, London (GB); Alexander Lytchier, London (GB); Jan Xu, London (GB); Arsalan Zafar, London (GB)

(73) Assignee: DEEP RENDER LTD., London (GB)

( * ) Notice: Subject to any disclaimer, the term of this patent is extended or adjusted under 35 U.S.C. 154(b) by 0 days.

(21) Appl. No.: 18/099,444

(22) Filed: Jan. 20, 2023

(65) Prior Publication Data

US 2023/0230288 A1 Jul. 20, 2023

Related U.S. Application Data

(63) Continuation of application No. PCT/GB2021/051858, filed on Jul. 20, 2021, which is
(Continued)

(30) Foreign Application Priority Data

Jul. 20, 2020 (GB) .................................... 2011176
Aug. 11, 2020 (GB) .................................... 2012461
(Continued)

(51) Int. Cl.
*G06T 9/00* (2006.01)
*G06N 3/084* (2023.01)
(Continued)

(52) U.S. Cl.
CPC ............. *G06T 9/002* (2013.01); *G06N 3/084* (2013.01)

(58) Field of Classification Search
CPC ................................ G06T 9/002; G06N 3/084
See application file for complete search history.

(56) References Cited

U.S. PATENT DOCUMENTS 10,373,300 B1    8/2019   Besenbruch et al.
10,489,936 B1   11/2019   Zafar et al.
(Continued)

FOREIGN PATENT DOCUMENTS

WO     2021220008 A1    11/2021

OTHER PUBLICATIONS

Chen Li-Heng et al, "ProxIQA: A Proxy Approach to Perceptual Optimization of Learned Image Compression", US Oct. 19, 2019 (Oct. 19, 2019), vol. 30, p. 360-373.
(Continued)

*Primary Examiner* — John W Lee
(74) *Attorney, Agent, or Firm* — Saul Ewing LLP

(57) ABSTRACT

A computer-implemented method of training an image generative network $f_\theta$ for a set of training images, in which an output image $\hat{x}$ is generated from an input image $x$ of the set of training images non-losslessly, and in which a proxy network is trained for a gradient intractable perceptual metric that evaluates a quality of an output image $\hat{x}$ given an input image $x$, the method of training using a plurality of scales for input images from the set of training images. In an embodiment, a blindspot network $b_\alpha$ is trained which generates an output image $\tilde{x}$ from an input image $x$. Related computer systems, computer program products and computer-implemented methods of training are disclosed.

20 Claims, 12 Drawing Sheets

Related U.S. Application Data a continuation of application No. PCT/GB2021/051041, filed on Apr. 29, 2021.

(60) Provisional application No. 63/053,807, filed on Jul. 20, 2020.

(30) Foreign Application Priority Data

| | | | |
|---|---|---|---|
| Aug. 11, 2020 | (GB) | ................................ | 2012462 |
| Aug. 11, 2020 | (GB) | ................................ | 2012463 |
| Aug. 11, 2020 | (GB) | ................................ | 2012465 |
| Aug. 11, 2020 | (GB) | ................................ | 2012467 |
| Aug. 11, 2020 | (GB) | ................................ | 2012468 |
| Aug. 11, 2020 | (GB) | ................................ | 2012469 |
| Oct. 23, 2020 | (GB) | ................................ | 2016824 |
| Dec. 10, 2020 | (GB) | ................................ | 2019531 |

(51) Int. Cl.

| | |
|---|---|
| *G06N 3/044* | (2023.01) |
| *G06N 3/045* | (2023.01) |
| *G06N 3/047* | (2023.01) |
| *G06N 3/088* | (2023.01) |
| *H04N 19/59* | (2014.01) |
| *G06N 20/10* | (2019.01) |

(56) References Cited

U.S. PATENT DOCUMENTS

2019/0244680 A1\* 8/2019 Rolfe .................. G06N 3/045
2020/0104678 A1\* 4/2020 Nixon ................. G06N 3/042

OTHER PUBLICATIONS

Karras Tero et al, "Progressive Growing of GANs for Improved Quality, Stability, and Variation", Feb. 26, 2018.
International Search Report, dated Jan. 4, 2022, issued in priority International Application No. PCT/GB2021/051858.

\* cited by examiner

IMAGE COMPRESSION AND DECODING, VIDEO COMPRESSION AND DECODING: TRAINING METHODS AND TRAINING SYSTEMS

CROSS-REFERENCE TO RELATED APPLICATIONS

This application is a bypass continuation of International Application No. PCT/GB2021/051858, filed on Jul. 20, 2021, which claims priority to GB Application No. GB2011176.1, filed on Jul. 20, 2020; U.S. Application No. 63/053,807, filed on Jul. 20, 2020; GB Application No. GB2012461.6, filed on Aug. 11, 2020; GB Application No. 2012462.4, filed on Aug. 11, 2020; GB Application No. 2012163.2, filed on Aug. 11, 2020; GB Application No. 2012465.7, filed on Aug. 11, 2020; GB Application No. GB2012467.3, filed on Aug. 11, 2020; GB Application No. 2012468.1, filed on Aug. 11, 2020; GB Application No. GB2012469.9, filed on Aug. 11, 2020; GB Application No. GB2016824.1, filed on Oct. 23, 2020; GB Application No. GB2019531.9, filed on Dec. 10, 2020; and International Application No. PCT/GB2021/051041, filed on Apr. 29, 2021, the entire contents of which being fully incorporated herein by reference.

BACKGROUND OF THE INVENTION

1. Field of the Invention

The field of the invention relates to computer-implemented training methods and training systems for an image generative network, e.g. one for image compression and decoding, and to related computer-implemented methods and systems for image generation, e.g. image compression and decoding, and to related computer-implemented methods and systems for video generation, e.g. video compression and decoding.

2. Technical Background

There is increasing demand from users of communications networks for images and video content. Demand is increasing not just for the number of images viewed, and for the playing time of video; demand is also increasing for higher resolution, lower distortion content, if it can be provided.

When images are compressed at a source device in a lossy way, this can lead to distortions or artifacts when the images are decompressed at a recipient device. It is desirable to train image encoders and decoders so that distortions or artifacts are minimized when the images are decompressed.

3. Discussion of Related Art

U.S. Ser. No. 10/373,300B1 discloses a system and method for lossy image and video compression and transmission that utilizes a neural network as a function to map a known noise image to a desired or target image, allowing the transfer only of hyperparameters of the function instead of a compressed version of the image itself. This allows the recreation of a high-quality approximation of the desired image by any system receiving the hyperparameters, provided that the receiving system possesses the same noise image and a similar neural network. The amount of data required to transfer an image of a given quality is dramatically reduced versus existing image compression technology. Being that video is simply a series of images, the application of this image compression system and method allows the transfer of video content at rates greater than previous technologies in relation to the same image quality.

U.S. Ser. No. 10/489,936B1 discloses a system and method for lossy image and video compression that utilizes a metanetwork to generate a set of hyperparameters necessary for an image encoding network to reconstruct the desired image from a given noise image.

Application PCT/GB2021/051041, which is incorporated by reference, discloses methods and systems for image compression and decoding, and for video compression and decoding.

SUMMARY OF THE INVENTION

According to a first aspect of the invention, there is provided a computer-implemented method of training an image generative network $f_\theta$ for a set of training images, in which an output image $\hat{x}$ is generated from an input image $x$ of the set of training images non-losslessly, and in which a proxy network is trained for a gradient intractable perceptual metric that evaluates a quality of an output image $\hat{x}$ given an input image $x$, the method of training using a plurality of scales for input images from the set of training images, the method including the steps of:

(i) receiving an input image $x$ of the set of training images and generating one or more images which are derived from $x$ to make a multiscale set of images $\{x_i\}$ which includes $x$;

(ii) the image generative network $f_\theta$ generating an output image $\hat{x}_i$ is from an input image $x_i \in \{x_i\}$, without tracking gradients for $f_\theta$;

(iii) the proxy network outputting an approximated function output $\hat{y}_i$, using the $x_i$ and the $\hat{x}_i$ as inputs;

(iv) the gradient intractable perceptual metric outputting a function output $y_i$, using the $x_i$ and the $\hat{x}_i$ as inputs;

(v) evaluating a loss for the proxy network, using the $y_i$ and the $\hat{y}_i$ as inputs, and including the evaluated loss for the proxy network in a loss array for the proxy network;

(vi) repeating steps (ii) to (v) for all the images $x_i$ in the multiscale set of images $\{x_i\}$;

(vii) using backpropagation to compute gradients of parameters of the proxy network with respect to an aggregation of the loss array assembled in executions of step (v);

(viii) optimizing the parameters of the proxy network based on the results of step (vii), to provide an optimized proxy network;

(ix) the image generative network $f_\theta$ generating an output image $\hat{x}_i$ from an input image $x_i \in \{x_i\}$;

(x) the optimized proxy network outputting an optimized approximated function output $\hat{y}_i$, using the $x_i$ and the $\hat{x}_i$ as inputs;

(xi) evaluating a loss for the generative network $f_\theta$, using the $x_i$, the $\hat{x}_i$ and the optimized approximated function output $\hat{y}_i$ as inputs, and including the evaluated loss for the generative network $f_\theta$ in a loss array for the generative network $f_\theta$;

(xii) repeating steps (ix) to (xi) for all the images $x_i$ in the multiscale set of images $\{x_i\}$;

(xiii) using backpropagation to compute gradients of parameters of the generative network $f_\theta$ with respect to an aggregation of the loss array assembled in executions of step (xi):

(xiv) optimizing the parameters of the generative network $f_\theta$ based on the results of step (xiii), to provide an optimized generative network $f_\theta$, and (xv) repeating steps (i) to (xiv) for each member of the set of training images.

An advantage is that the multiscale set of images provides improved stability during the training. An advantage is that the proxy network is more robust against adversarial samples. An advantage is that the proxy network is more robust against artifact generation. An advantage is that within the field of learned image and video compression the method allows networks to train with non-differentiable perceptual metrics.

The method may be one wherein steps (ii) to (xv) are repeated for the set of training images, to train the generative network $f_\theta$ and to train the proxy network. An advantage is improved training of the image generative network. An advantage is improved training of the proxy network.

The method may be one including the step (xvi) of storing the parameters of the trained generative network $f_\theta$ and the parameters of the trained proxy network.

The method may be one wherein the one or more images which are derived from x to make a multiscale set of images $\{x_i\}$ are derived by downsampling. An advantage is improved stability during the training. An advantage is that the proxy network is more robust against adversarial samples. An advantage is that the proxy network is more robust against artifact generation.

The method may be one wherein the image generative network $f_\theta$ is a neural network.

The method may be one wherein the rate of change of every parameter in the network is computed with respect to its associated loss, and the parameters are updated in such a way that as to either minimise or maximise the associated loss.

The method may be one wherein the proxy network is a neural network.

The method may be one wherein the proxy network is robust against adversarial examples.

The method may be one wherein the gradients of the proxy network are treated as a noisy differentiable relaxation of the intractable gradients of the gradient intractable perceptual metric.

The method may be one wherein when the pre-trained proxy network is frozen, the generative network $f_\theta$ will learn to produce examples outside of the learnt boundary of the proxy network.

The method may be one wherein a training of $\hat{h}_\phi$ involves samples of $f_\theta(x)$ and x, but does not require gradients for $\hat{x}$.

The method may be one wherein the generative network $f_\theta$ includes an encoder, which encodes (by performing lossy encoding) an input image x into a bitstream, and includes a decoder, which decodes the bitstream into an output image $\hat{x}$.

The method may be one wherein the method includes an iteration of a training pass of the generative network, and a training pass of the proxy network. An advantage is improved stability during the training.

The method may be one wherein the generative and proxy networks have separate optimizers. An advantage is improved stability during the training.

The method may be one wherein for the case of proxy network optimization, gradients do not flow through the generative network.

The method may be one wherein the method is used for learned image compression.

The method may be one wherein the number of input and output parameters to the gradient intractable perceptual metric is arbitrary.

The method may be one wherein the gradient intractable perceptual metric is a perceptual loss function.

The method may be one wherein the gradient intractable perceptual metric is VMAF, VIF, DLM or IFC, or a mutual information based estimator.

The method may be one wherein the generative network includes a compression network, wherein a term is added to the total loss of the compression network to stabilise the initial training of the compression network. An advantage is improved stability during the initial training.

The method may be one wherein the generative loss includes a generic distortion loss which includes one or more stabilisation terms. An advantage is improved stability during the training.

The method may be one wherein the stabilisation terms include Mean Squared Error (MSE) or a combination of analytical losses with weighted deep-embeddings of a pre-trained neural network. An advantage is improved stability during the training.

The method may be one wherein a receptive field covers a larger portion of an image for a downsampled input image. An advantage is the method is more robust against adversarial samples. An advantage is the method is more robust against artifact generation.

The method may be one wherein a perceptual quality score is assigned to the image at each scale and is aggregated by an aggregation function. An advantage is improved stability during the training. An advantage is that the proxy network is more robust against adversarial samples. An advantage is that the proxy network is more robust against artifact generation.

The method may be one wherein a user is able to select a number of scales to use in the multiscale set of images. An advantage is the thoroughness of the training is user selectable.

The method may be one wherein the set of images includes a downsampled image that has been downsampled by a factor of two in each dimension.

The method may be one wherein the set of images includes a downsampled image that has been downsampled by a factor of four in each dimension.

The method may be one wherein the mean of the $\hat{y}_i$ is used to train the image generative network by attempting to maximise or minimise the mean of the $\hat{y}_i$ using stochastic gradient descent. An advantage is improved stability during the training. An advantage is that the proxy network is more robust against adversarial samples. An advantage is that the proxy network is more robust against artifact generation.

The method may be one wherein the predictions $y_i$ are used to train the proxy network to force its predictions to be closer to an output of the perceptual metric, using stochastic gradient descent. An advantage is improved stability during the training. An advantage is that the proxy network is more robust against adversarial samples. An advantage is that the proxy network is more robust against artifact generation.

The method may be one wherein for each image x, an RGB image is provided.

According to a second aspect of the invention, there is provided a computer system configured to train an image generative network $f_\theta$ for a set of training images, in which the system generates an output image $\hat{x}$ from an input image x of the set of training images non-losslessly, and in which a proxy network is trained for a gradient intractable perceptual metric that evaluates a quality of an output image $\hat{x}$ given an input image x, wherein the computer system is configured to:

(i) receive an input image x from the set of training images and generate one or more images which are derived from x to make a multiscale set of images $\{x_i\}$ which includes x;

(ii) use the image generative network $f_\theta$ to generate an output image $\hat{x}_i$ from an input image $x_i \in \{x_i\}$, without tracking gradients for $f_\theta$;
(iii) use the proxy network to output an approximated function output $\hat{y}_i$, using the $x_i$ and the $\hat{x}_i$ is as inputs;
(iv) use the gradient intractable perceptual metric to output a function output $y_i$, using the $x_i$ and the $\hat{x}_i$ as inputs;
(v) evaluate a loss for the proxy network, using the $y_i$ and the $\hat{y}_i$ as inputs, and to include the evaluated loss for the proxy network in a loss array for the proxy network;
(vi) repeat (ii) to (v) for all the images $x_i$ in the multiscale set of images $\{x_i\}$;
(vii) use backpropagation to compute gradients of parameters of the proxy network with respect to an aggregation of the loss array assembled in executions of (v);
(viii) optimize the parameters of the proxy network based on the results of (vii), to provide an optimized proxy network;
(ix) use the image generative network $f_\theta$ to generate an output image $\hat{x}_i$ from an input image $x_i \in \{x_i\}$;
(x) use the optimized proxy network to output an optimized approximated function output $\hat{y}_i$, using the $x_i$ and the $\hat{x}_i$ as inputs;
(xi) evaluate a loss for the generative network $f_\theta$, using the $x_i$, the $\hat{x}_i$ and the optimized approximated function output $\hat{y}_i$ as inputs, and to include the evaluated loss for the generative network $f_\theta$ in a loss array for the generative network $f_\theta$;
(xii) repeat (ix) to (xi) for all the images $x_i$ in the multiscale set of images $\{x_i\}$;
(xiii) use backpropagation to compute gradients of parameters of the generative network $f_\theta$ with respect to an aggregation of the loss array assembled in executions of (xi);
(xiv) optimize the parameters of the generative network $f_\theta$ based on the results of (xiii), to provide an optimized generative network $f_\theta$, and
(xv) repeat (i) to (xiv) for each member of the set of training images.

An advantage is that the multiscale set of images provides improved stability during training by the computer system. An advantage is that the proxy network is more robust against adversarial samples. An advantage is that the proxy network is more robust against artifact generation.

The computer system may be one wherein (ii) to (xv) are repeated for the set of training images, to train the generative network $f_\theta$ and to train the proxy network.

The computer system may be configured to perform a method of any aspect of the first aspect of the invention.

According to a third aspect of the invention, there is provided a computer program product executable on a processor to train an image generative network $f_\theta$ for a set of training images, in which an output image $\hat{x}$ is generated from an input image x of the set of training images non-losslessly, and a proxy network is trained for a gradient intractable perceptual metric that evaluates a quality of an output image $\hat{x}$ given an input image x, the computer program product executable to:
(i) receive an input image x of the set of training images and generate one or more images which are derived from x to make a multiscale set of images $\{x_i\}$ which includes x;
(ii) use the image generative network $f_\theta$ to generate an output image $\hat{x}_i$ from an input image $x_i \in \{x_i\}$, without tracking gradients for $f_\theta$;
(iii) use the proxy network to output an approximated function output $\hat{y}_i$, using the $x_i$ and the $\hat{x}_i$ as inputs;
(iv) use the gradient intractable perceptual metric to output a function output $y_i$, using the $x_i$ and the $\hat{x}_i$ as inputs;
(v) evaluate a loss for the proxy network, using the $y_i$ and the $\hat{y}_i$ as inputs, and to include the evaluated loss for the proxy network in a loss array for the proxy network;
(vi) repeat (ii) to (v) for all the images $x_i$ in the multiscale set of images $\{x_i\}$;
(vii) use backpropagation to compute gradients of parameters of the proxy network with respect to an aggregation of the loss array assembled in executions of (v);
(viii) optimize the parameters of the proxy network based on the results of (vii), to provide an optimized proxy network;
(ix) use the image generative network $f_\theta$ to generate an output image $\hat{x}_i$ from an input image $x_i \in \{x_i\}$;
(x) use the optimized proxy network to output an optimized approximated function output $\hat{y}_i$, using the $x_i$ and the $\hat{x}_i$ as inputs;
(xi) evaluate a loss for the generative network $f_\theta$, using the $x_i$, the $\hat{x}_i$ and the optimized approximated function output $\hat{y}_i$ as inputs, and to include the evaluated loss for the generative network $f_\theta$ in a loss array for the generative network $f_\theta$;
(xii) repeat (ix) to (xi) for all the images $x_i$ in the multiscale set of images $\{x_i\}$;
(xiii) use backpropagation to compute gradients of parameters of the generative network $f_\theta$ with respect to an aggregation of the loss array assembled in executions of (xi);
(xiv) optimize the parameters of the generative network $f_\theta$ based on the results of (xiii), to provide an optimized generative network $f_\theta$, and
(xv) repeat (i) to (xiv) for each member of the set of training images.

An advantage is that the multiscale set of images provides improved stability during the training. An advantage is that the proxy network is more robust against adversarial samples. An advantage is that the proxy network is more robust against artifact generation.

The computer program product may be one wherein (ii) to (xv) are repeated for the set of training images, to train the generative network $f_\theta$ and to train the proxy network.

The computer program product may be one executable on the processor to perform a method of any aspect of the first aspect of the invention.

According to a fourth aspect of the invention, there is provided a computer-implemented method of training an image generative network $f_\theta$ for a set of training images, in which an output image $\hat{x}$ is generated from an input image x of the set of training images non-losslessly, and in which a proxy network is trained for a gradient intractable perceptual metric that evaluates a quality of an output image $\hat{x}$ given an input image x, the method of training using a plurality of scales for input images from the set of training images.

The method may be one including a method of any aspect of the first aspect of the invention.

An advantage is that the multiscale set of images provides improved stability during the training. An advantage is that the proxy network is more robust against adversarial samples. An advantage is that the proxy network is more robust against artifact generation.

According to a fifth aspect of the invention, there is provided a system including a first computer system and a second computer system, the first computer system including a lossy encoder including a first trained neural network, the second computer system including a decoder including a second trained neural network, wherein the second computer system is in communication with the first computer system, the lossy encoder configured to produce a bitstream from an input image; the first computer system configured to transmit the bitstream to the second computer system, wherein the decoder is configured to decode the bitstream to produce an output image; wherein the first computer system in communication with the second computer system comprises a generative network, wherein the generative network is trained using a method according to any aspect of the first aspect of the invention.

An advantage is that the generative network is more robust against artifact generation. An advantage is that the generative network is more robust against adversarial samples.

The system may be one in which the system is for image or video compression, transmission and decoding, wherein (i) the first computer system is configured to receive an input image;
(ii) the first computer system is configured to encode the input image using the first trained neural network, to produce a latent representation;
(iii) the first computer system is configured to quantize the latent representation to produce a quantized latent;
(iv) the first computer system is configured to entropy encode the quantized latent into a bitstream;
(v) the first computer system is configured to transmit the bitstream to the second computer system;
(vi) the second computer system is configured to entropy decode the bitstream to produce the quantized latent;
(vii) the second computer system is configured to use the second trained neural network to produce an output image from the quantized latent, wherein the output image is an approximation of the input image. Quantizing, entropy encoding and entropy decoding details are provided in PCT/GB2021/051041.

An advantage is that for a fixed file size ("rate"), a reduced output image distortion is obtained.

The system may be one wherein the first computer system is a server, e.g. a dedicated server, e.g. a machine in the cloud with dedicated GPUs e.g. Amazon Web Services, Microsoft Azure, etc, or any other cloud computing services.

The system may be one wherein the first computer system is a user device.

The system may be one wherein the user device is a laptop computer, desktop computer, a tablet computer or a smart phone.

The system may be one wherein the first trained neural network includes a library installed on the first computer system.

The system may be one wherein the first trained neural network is parametrized by one or several convolution matrices $\Theta$, or the first trained neural network is parametrized by a set of bias parameters, non-linearity parameters, convolution kernel/matrix parameters.

The system may be one wherein the second computer system is a recipient device.

The system may be one wherein the recipient device is a laptop computer, desktop computer, a tablet computer, a smart TV or a smart phone.

The system may be one wherein the second trained neural network includes a library installed on the second computer system.

The system may be one wherein the second trained neural network is parametrized by one or several convolution matrices $\Omega$, or the second trained neural network is parametrized by a set of bias parameters, non-linearity parameters, convolution kernel/matrix parameters.

According to a sixth aspect of the invention, there is provided a computer-implemented method of training an image generative network $f_\theta$ for a set of training images, in which an output image $\hat{x}$ is generated from an input image x of the set of training images non-losslessly, in which a blindspot network $b_\alpha$ is trained which generates an output image $\tilde{x}$ from an input image x, in which a proxy network is trained for a gradient intractable perceptual metric that evaluates a quality of an output image $\hat{x}$ given an input image x, and in which a blindspot proxy network is trained for labelling blindspot samples, the method including the steps of:
(i) the blindspot network $b_\alpha$ generating an output image $\tilde{x}$ from an input image x of the set of training images;
(ii) the blindspot proxy network outputting a blindspot function output $\tilde{y}$, using x and $\tilde{x}$ as inputs;
(iii) the gradient intractable perceptual metric outputting a function output y, using x and $\tilde{x}$ as inputs;
(iv) evaluating a loss for the blindspot network, using y and $\tilde{y}$ as inputs;
(v) using backpropagation to compute gradients of parameters of the blindspot network with respect to the loss evaluated in step (iv);
(vi) optimizing the parameters of the blindspot network based on the results of step (v), to provide an optimized blindspot network;
(vii) the image generative network $f_\theta$ generating an output image $\hat{x}$ from an input image x, without tracking gradients for $f_\theta$;
(viii) the proxy network outputting an approximated function output $\hat{y}$, using x and $\hat{x}$ as inputs;
(ix) the gradient intractable perceptual metric outputting a function output y, using x and $\hat{x}$ as inputs;
(x) evaluating a loss for the proxy network, using y and $\hat{y}$ as inputs;
(xi) using backpropagation to compute gradients of parameters of the proxy network with respect to the loss evaluated in step (x);
(xii) optimizing the parameters of the proxy network based on the results of step (xi), to provide an optimized proxy network;
(xiii) the blindspot network $b_\alpha$ generating an output image $\tilde{x}$ from an input image x, without tracking gradients for $b_\alpha$;
(xiv) the blindspot proxy network outputting a representation $\tilde{y}$, using x and $\tilde{x}$ as inputs;
(xv) a blindspot label function outputting a labelled output y of a blindspot sample;
(xvi) evaluating a loss for the blindspot proxy network, using y and $\tilde{y}$ as inputs;
(xvii) using backpropagation to compute gradients of parameters of the blindspot proxy network with respect to the loss evaluated in step (xvi);
(xviii) optimizing the parameters of the blindspot proxy network based on the results of step (xvii), to provide an optimized proxy network;
(xix) the image generative network $f_\theta$ generating an output image $\hat{x}$ from an input image x;
(xx) the optimized proxy network outputting an optimized approximated function output $\hat{y}$, using x and $\hat{x}$ as inputs;
(xxi) evaluating a loss for the generative network $f_\theta$, using x, $\hat{x}$ and the optimized approximated function output $\hat{y}$ as inputs;
(xxii) using backpropagation to compute gradients of parameters of the generative network $f_\theta$ with respect to the loss evaluated in step (xxi);
(xxiii) optimizing the parameters of the generative network $f_\theta$ based on the results of step (xxii), to provide an optimized generative network $f_\theta$, and
(xxiv) repeating steps (i) to (xxiii) for each member of the set of training images.

An advantage is that the trained generative network is more robust against blind spots. An advantage is that the trained generative network is more robust against artifact generation. An advantage is that the proxy network is more robust against adversarial samples. An advantage is that the proxy network is more robust against artifact generation. An advantage is that within the field of learned image and video compression, the method allows networks to train with non-differentiable perceptual metrics.

The method may be one in which the method is repeated for the set of training images to train the generative network $f_\theta$, to train the blindspot network $b_\alpha$, to train the blindspot proxy network and to train the proxy network.

The method may be one including the step of: (xxv) storing the parameters of the trained generative network $f_\theta$, the parameters of the trained blindspot network $b_\alpha$, the parameters of the trained blindspot proxy network and the parameters of the trained proxy network.

The method may be one wherein a plurality of scales are used for input image x. An advantage is improved stability during the training. An advantage is that the proxy network is more robust against adversarial samples. An advantage is that the proxy network is more robust against artifact generation.

The method may be one wherein a regularisation term is added to the loss for the generative network $f_\theta$, in which the term includes a function that penalises the generative network when predicting adversarial samples. An advantage is improved stability during the training. An advantage is that the proxy network is more robust against adversarial samples. An advantage is that the proxy network is more robust against artifact generation.

The method may be one wherein a function that penalises the generative network when predicting adversarial samples is a pixelwise error for perceptual proxy losses. An advantage is improved stability during the training. An advantage is that the proxy network is more robust against adversarial samples. An advantage is that the proxy network is more robust against artifact generation.

The method may be one wherein the regularisation term acts as a deterrent for the generative model, and steers it away from finding a basin on the loss surface which satisfies the proxy and the target function, but which includes blind spot samples. An advantage is improved stability during the training.

The method may be one wherein the regularisation term forces the model to find another basin to settle in. An advantage is that the proxy network is more robust against adversarial samples. An advantage is that the proxy network is more robust against artifact generation.

The method may be one wherein the regularisation term produces high loss values for adversarial images. An advantage is that the proxy network is more robust against adversarial samples. An advantage is that the proxy network is more robust against artifact generation.

The method may be one wherein a regularisation function is found by evaluating a set of loss functions on a set of adversarial samples, and selecting the loss function which produces the highest loss term. An advantage is that the proxy network is more robust against adversarial samples. An advantage is that the proxy network is more robust against artifact generation.

The method may be one wherein mitigation of blind spot samples is performed by training the proxy on samples with self imposed labels to force the network components to avoid the blind spot boundaries in the loss surface.

The method may be one wherein adversarial samples are collected, either from a model that is known to produce adversarial samples or synthetically generated by an algorithm which adds noise or artefacts that resemble the artefacts seen on adversarial samples; this stored set of adversarial images are each assigned a label such that a respective label conveys to the blindspot proxy network that a respective sample is an undesired sample. An advantage is that the proxy network is more robust against adversarial samples. An advantage is that the proxy network is more robust against artifact generation.

The method may be one wherein during the blindspot proxy network training, the input images are obtained from the generative model and the labels are obtained from the loss function of the blindspot proxy network.

The method may be one wherein the blindspot proxy network is trained once on the adversarial sample for every N samples from the generative model, where N>1, e.g. N=20.

The method may be one wherein an online method of generating the adversarial samples is provided.

The method may be one wherein in this method there exists a network configuration that only generates adversarial samples during its training by default, due to some model miss-specification; wherein this network, referred to as the blind spot network, produces adversarial samples for our blindspot proxy network loss function and therefore helps to define the underlying non-differentiable function.

The method may be one wherein the blind spot network is used to generate adversarial samples to train the proxy against.

The method may be one wherein a set of adversarial samples is not stored, but are instead generated in an online fashion using the blind-spot network, which is also learning.

According to a seventh aspect of the invention, there is provided a computer system configured to train an image generative network $f_\theta$ for a set of training images, in which an output image $\hat{x}$ is generated from an input image x of the set of training images non-losslessly, in which a blindspot network $b_\alpha$ is trained which generates an output image $\tilde{x}$ from an input image x, in which a proxy network is trained for a gradient intractable perceptual metric that evaluates a quality of an output image $\hat{x}$ given an input image x, and in which a blindspot proxy network is trained for labelling blindspot samples, wherein the computer system is configured to:

(i) use the blindspot network $b_\alpha$ to generate an output image $\tilde{x}$ from an input image x of the set of training images;
(ii) use the blindspot proxy network to output a blindspot function output $\tilde{y}$, using x and $\tilde{x}$ as inputs;
(iii) use the gradient intractable perceptual metric to output a function output y, using x and $\tilde{x}$ as inputs;
(iv) evaluate a loss for the blindspot network, using y and $\tilde{y}$ as inputs;
(v) use backpropagation to compute gradients of parameters of the blindspot network with respect to the loss evaluated in (iv);
(vi) optimize the parameters of the blindspot network based on the results of (v), to provide an optimized blindspot network;
(vii) use the image generative network $f_\theta$ to generate an output image $\hat{x}$ from an input image x, without tracking gradients for $f_\theta$;
(viii) use the proxy network to output an approximated function output $\hat{y}$, using x and $\hat{x}$ as inputs;
(ix) use the gradient intractable perceptual metric to output a function output y, using x and $\hat{x}$ as inputs;

(x) evaluate a loss for the proxy network, using y and ŷ as inputs;
(xi) use backpropagation to compute gradients of parameters of the proxy network with respect to the loss evaluated in (x);
(xii) optimize the parameters of the proxy network based on the results of (xi), to provide an optimized proxy network;
(xiii) use the blindspot network $b_\alpha$ to generate an output image x̃ from an input image x, without tracking gradients for $b_\alpha$;
(xiv) use the blindspot proxy network to output a representation ỹ, using x and x̃ as inputs;
(xv) use a blindspot label function to output a labelled output y of a blindspot sample;
(xvi) evaluate a loss for the blindspot proxy network, using y and ỹ as inputs;
(xvii) use backpropagation to compute gradients of parameters of the blindspot proxy network with respect to the loss evaluated in (xvi);
(xviii) optimize the parameters of the blindspot proxy network based on the results of (xvii), to provide an optimized proxy network;
(xix) use the image generative network $f_\theta$ to generate an output image x̂ from an input image x;
(xx) use the optimized proxy network to output an optimized approximated function output ŷ, using x and x̂ as inputs;
(xxi) evaluate a loss for the generative network $f_\theta$, using x, x̂ and the optimized approximated function output ŷ as inputs;
(xxii) use backpropagation to compute gradients of parameters of the generative network $f_\theta$ with respect to the loss evaluated in (xxi);
(xxiii) optimize the parameters of the generative network $f_\theta$ based on the results of (xxii), to provide an optimized generative network $f_\theta$, and
(xxiv) repeat (i) to (xxiii) for each member of the set of training images.

The system may be one in which (i) to (xxiv) are repeated for the set of training images to train the generative network $f_\theta$, to train the blindspot network $b_\alpha$, to train the blindspot proxy network and to train the proxy network.

The system may be one in which the parameters are stored of the trained generative network $f_\theta$, the parameters of the trained blindspot network $b_\alpha$, the parameters of the trained blindspot proxy network and the parameters of the trained proxy network.

The computer system may be configured to perform a method of any aspect of the sixth aspect of the invention.

According to an eighth aspect of the invention, there is provided a computer program product executable on a processor to train an image generative network $f_\theta$ for a set of training images, in which an output image x̂ is generated from an input image x of the set of training images non-losslessly, in which a blindspot network $b_\alpha$ is trained which generates an output image x̃ from an input image x, in which a proxy network is trained for a gradient intractable perceptual metric that evaluates a quality of an output image x̂ given an input image x, and in which a blindspot proxy network is trained for labelling blindspot samples, the computer program product executable to:
(i) use the blindspot network $b_\alpha$ to generate an output image x̃ from an input image x of the set of training images;
(ii) use the blindspot proxy network to output a blindspot function output ỹ, using x and x̃ as inputs;
(iii) use the gradient intractable perceptual metric to output a function output y, using x and x̃ as inputs;
(iv) evaluate a loss for the blindspot network, using y and ỹ as inputs;
(v) use backpropagation to compute gradients of parameters of the blindspot network with respect to the loss evaluated in (iv);
(vi) optimize the parameters of the blindspot network based on the results of (v), to provide an optimized blindspot network;
(vii) use the image generative network $f_\theta$ to generate an output image x̂ from an input image x, without tracking gradients for $f_\theta$;
(viii) use the proxy network to output an approximated function output ŷ, using x and x̂ as inputs;
(ix) use the gradient intractable perceptual metric to output a function output y, using x and x̂ as inputs;
(x) evaluate a loss for the proxy network, using y and ŷ as inputs;
(xi) use backpropagation to compute gradients of parameters of the proxy network with respect to the loss evaluated in (x);
(xii) optimize the parameters of the proxy network based on the results of (xi), to provide an optimized proxy network;
(xiii) use the blindspot network $b_\alpha$ to generate an output image x̃ from an input image x, without tracking gradients for $b_\alpha$;
(xiv) use the blindspot proxy network to output a representation ỹ, using x and x̃ as inputs;
(xv) use a blindspot label function to output a labelled output y of a blindspot sample;
(xvi) evaluate a loss for the blindspot proxy network, using y and ỹ as inputs;
(xvii) use backpropagation to compute gradients of parameters of the blindspot proxy network with respect to the loss evaluated in (xvi);
(xviii) optimize the parameters of the blindspot proxy network based on the results of (xvii), to provide an optimized proxy network;
(xix) use the image generative network $f_\theta$ to generate an output image x̂ from an input image x;
(xx) use the optimized proxy network to output an optimized approximated function output ŷ, using x and x̂ as inputs:
(xxi) evaluate a loss for the generative network $f_\theta$, using x, x̂ and the optimized approximated function output ŷ as inputs;
(xxii) use backpropagation to compute gradients of parameters of the generative network $f_\theta$ with respect to the loss evaluated in (xxi);
(xxiii) optimize the parameters of the generative network $f_\theta$ based on the results of (xxii), to provide an optimized generative network $f_\theta$, and
(xxiv) repeat (i) to (xxiii) for each member of the set of training images.

The computer program product may be executable to repeat (i) to (xxiv) for the set of training images to train the generative network $f_\theta$, to train the blindspot network $b_\alpha$, to train the blindspot proxy network and to train the proxy network.

The computer program product may be executable to store the parameters of the trained generative network $f_\theta$, the parameters of the trained blindspot network $b_\alpha$, the parameters of the trained blindspot proxy network and the parameters of the trained proxy network.

The computer program product may be executable on the processor to perform a method of any aspect of the sixth aspect of the invention.

According to a ninth aspect of the invention, there is provided a computer-implemented method of training an image generative network $f_\theta$ for a set of training images, in which an output image $\hat{x}$ is generated from an input image x of the set of training images non-losslessly, in which a blindspot network $b_\alpha$ is trained which generates an output image $\tilde{x}$ from an input image x, in which a proxy network is trained for a gradient intractable perceptual metric that evaluates a quality of an output image $\hat{x}$ given an input image x, and in which a blindspot proxy network is trained for labelling blindspot samples.

The method may be one including a method of any aspect of the sixth aspect of the invention.

According to a tenth aspect of the invention, there is provided a system including a first computer system and a second computer system, the first computer system including a lossy encoder including a first trained neural network, the second computer system including a decoder including a second trained neural network, wherein the second computer system is in communication with the first computer system, the lossy encoder configured to produce a bitstream from an input image; the first computer system configured to transmit the bitstream to the second computer system, wherein the decoder is configured to decode the bitstream to produce an output image; wherein the first computer system in communication with the second computer system comprises a generative network, wherein the generative network is trained using a method of any aspect of the sixth aspect of the invention.

The system may be one for image or video compression, transmission and decoding, wherein
(i) the first computer system is configured to receive an input image;
(ii) the first computer system is configured to encode the input image using the first trained neural network, to produce a latent representation;
(iii) the first computer system is configured to quantize the latent representation to produce a quantized latent;
(iv) the first computer system is configured to entropy encode the quantized latent into a bitstream;
(v) the first computer system is configured to transmit the bitstream to the second computer system;
(vi) the second computer system is configured to entropy decode the bitstream to produce the quantized latent;
(vii) the second computer system is configured to use the second trained neural network to produce an output image from the quantized latent, wherein the output image is an approximation of the input image. Quantizing, entropy encoding and entropy decoding details are provided in PCT/GB2021/051041.

According to an eleventh aspect of the invention, there is provided a computer-implemented method of training an image generative network $f_\theta$ for a set of training images, in which an output image $\hat{x}$ is generated from an input image x of the set of training images non-losslessly, and in which a proxy network is trained for a gradient intractable perceptual metric that evaluates a quality of an output image $\hat{x}$ given an input image x, the method including the steps of:
(i) the image generative network $f_\theta$ generating an output image $\hat{x}$ from an input image x of the set of training images, without tracking gradients for $f_\theta$;
(ii) the proxy network outputting an approximated function output $\hat{y}$, using x and $\hat{x}$ as inputs;
(iii) the gradient intractable perceptual metric outputting a function output y, using x and $\hat{x}$ as inputs;
(iv) evaluating a loss for the proxy network, using y and $\hat{y}$ as inputs;
(v) using backpropagation to compute gradients of parameters of the proxy network with respect to the loss evaluated in step (iv);
(vi) optimizing the parameters of the proxy network based on the results of step (v), to provide an optimized proxy network;
(vii) the image generative network $f_\theta$ generating an output image $\hat{x}$ from an input image x,
(viii) the optimized proxy network outputting an optimized approximated function output $\hat{y}$, using x and $\hat{x}$ as inputs;
(ix) evaluating a loss for the generative network $f_\theta$, using x, $\hat{x}$ and the optimized approximated function output $\hat{y}$ as inputs;
(x) using backpropagation to compute gradients of parameters of the generative network $f_\theta$ with respect to the loss evaluated in step (ix);
(xi) optimizing the parameters of the generative network $f_\theta$ based on the results of step (x), to provide an optimized generative network $f_\theta$, and
(xii) repeating steps (i) to (xi) for each member of the set of training images.

An advantage is that the proxy network is more robust against adversarial samples. An advantage is that the proxy network is more robust against artifact generation. An advantage is that within the field of learned image and video compression, the method allows networks to train with non-differentiable perceptual metrics.

The method may be one wherein the method is repeated for the set of training images, to train the generative network $f_\theta$ and to train the proxy network.

The method may be one including the step (xiii) of storing the parameters of the trained generative network $f_\theta$ and the parameters of the trained proxy network.

The method may be one wherein the image generative network $f_\theta$ is a neural network.

The method may be one wherein the proxy network is a neural network.

According to a twelfth aspect of the invention, there is provided a computer system configured to train an image generative network $f_\theta$ for a set of training images, in which an output image $\hat{x}$ is generated from an input image x of the set of training images non-losslessly, and in which a proxy network is trained for a gradient intractable perceptual metric that evaluates a quality of an output image $\hat{x}$ given an input image x, the computer system configured to:
(i) use the image generative network $f_\theta$ to generate an output image $\hat{x}$ from an input image x of the set of training images, without tracking gradients for $f_\theta$;
(ii) use the proxy network to output an approximated function output $\hat{y}$, using x and $\hat{x}$ as inputs;
(iii) use the gradient intractable perceptual metric to output a function output y, using x and $\hat{x}$ as inputs;
(iv) evaluate a loss for the proxy network, using y and 9 as inputs;
(v) use backpropagation to compute gradients of parameters of the proxy network with respect to the loss evaluated in (iv);
(vi) optimize the parameters of the proxy network based on the results of (v), to provide an optimized proxy network;
(vii) use the image generative network $f_\theta$ to generate an output image $\hat{x}$ from an input image x,
(viii) use the optimized proxy network to output an optimized approximated function output $\hat{y}$, using x and z as inputs;
(ix) evaluate a loss for the generative network $f_\theta$, using x, $\hat{x}$ and the optimized approximated function output $\hat{y}$ as inputs;

(x) use backpropagation to compute gradients of parameters of the generative network $f_\theta$ with respect to the loss evaluated in (ix);
(xi) optimize the parameters of the generative network $f_\theta$ based on the results of (x), to provide an optimized generative network $f_\theta$, and
(xii) repeat (i) to (xi) for each member of the set of training images.

The computer system may be one wherein (i) to (xii) are repeated for the set of training images, to train the generative network $f_\theta$ and to train the proxy network.

The computer system may be configured to perform a method of any aspect of the eleventh aspect of the invention.

According to a thirteenth aspect of the invention, there is provided a computer program product executable on a processor to train an image generative network $f_\theta$ for a set of training images, in which an output image $\hat{x}$ is generated from an input image x of the set of training images non-losslessly, and in which a proxy network is trained for a gradient intractable perceptual metric that evaluates a quality of an output image $\hat{x}$ given an input image x, the computer program product executable to:
(i) use the image generative network $f_\theta$ to generate an output image $\hat{x}$ from an input image x of the set of training images, without tracking gradients for $f_\theta$;
(ii) use the proxy network to output an approximated function output $\hat{y}$, using x and $\hat{x}$ as inputs;
(iii) use the gradient intractable perceptual metric to output a function output y, using x and $\hat{x}$ as inputs;
(iv) evaluate a loss for the proxy network, using y and $\hat{y}$ as inputs;
(v) use backpropagation to compute gradients of parameters of the proxy network with respect to the loss evaluated in (iv);
(vi) optimize the parameters of the proxy network based on the results of (v), to provide an optimized proxy network;
(vii) use the image generative network $f_\theta$ to generate an output image $\hat{x}$ from an input image x,
(viii) use the optimized proxy network to output an optimized approximated function output $\hat{y}$, using x and $\hat{x}$ as inputs;
(ix) evaluate a loss for the generative network $f_\theta$, using x, $\hat{x}$ and the optimized approximated function output $\hat{y}$ as inputs;
(x) use backpropagation to compute gradients of parameters of the generative network $f_\theta$ with respect to the loss evaluated in (ix);
(xi) optimize the parameters of the generative network $f_\theta$ based on the results of (x), to provide an optimized generative network $f_\theta$, and
(xii) repeat (i) to (xi) for each member of the set of training images.

The computer program product may be one wherein (i) to (xii) are repeated for the set of training images, to train the generative network $f_\theta$ and to train the proxy network.

The computer program product may be executable on the processor to perform a method of any aspect of the eleventh aspect of the invention.

According to a fourteenth aspect of the invention, there is provided a computer-implemented method of training an image generative network $f_\theta$ for a set of training images, in which an output image $\hat{x}$ is generated from an input image x of the set of training images non-losslessly, and in which a proxy network is trained for a gradient intractable perceptual metric that evaluates a quality of an output image $\hat{x}$ given an input image x.

The method may include a method of any aspect of the eleventh aspect of the invention.

According to a fifteenth aspect of the invention, there is provided a system including a first computer system and a second computer system, the first computer system including a lossy encoder including a first trained neural network, the second computer system including a decoder including a second trained neural network, wherein the second computer system is in communication with the first computer system, the lossy encoder configured to produce a bitstream from an input image; the first computer system configured to transmit the bitstream to the second computer system, wherein the decoder is configured to decode the bitstream to produce an output image; wherein the first computer system in communication with the second computer system comprises a generative network, wherein the generative network is trained using a method of any aspect of the eleventh aspect of the invention.

The system may be one in which the system is for image or video compression, transmission and decoding, wherein
(i) the first computer system is configured to receive an input image;
(ii) the first computer system is configured to encode the input image using the first trained neural network, to produce a latent representation;
(iii) the first computer system is configured to quantize the latent representation to produce a quantized latent;
(iv) the first computer system is configured to entropy encode the quantized latent into a bitstream:
(v) the first computer system is configured to transmit the bitstream to the second computer system;
(vi) the second computer system is configured to entropy decode the bitstream to produce the quantized latent;
(vii) the second computer system is configured to use the second trained neural network to produce an output image from the quantized latent, wherein the output image is an approximation of the input image. Quantizing, entropy encoding and entropy decoding details are provided in PCT/GB2021/051041.

Aspects of the invention may be combined.

In the above methods and systems, an image may be a single image, or an image may be a video image, or images may be a set of video images, for example.

The above methods and systems may be applied in the video domain.

A network may be a neural network. Networks may be neural networks.

For each of the above methods, a related system may be provided.

For each of the above training methods, a related computer program product may be provided.

BRIEF DESCRIPTION OF THE FIGURES

Aspects of the invention will now be described, by way of example(s), with reference to the following Figures, in which.

DETAILED DESCRIPTION

Technology Overview

Figure 1:
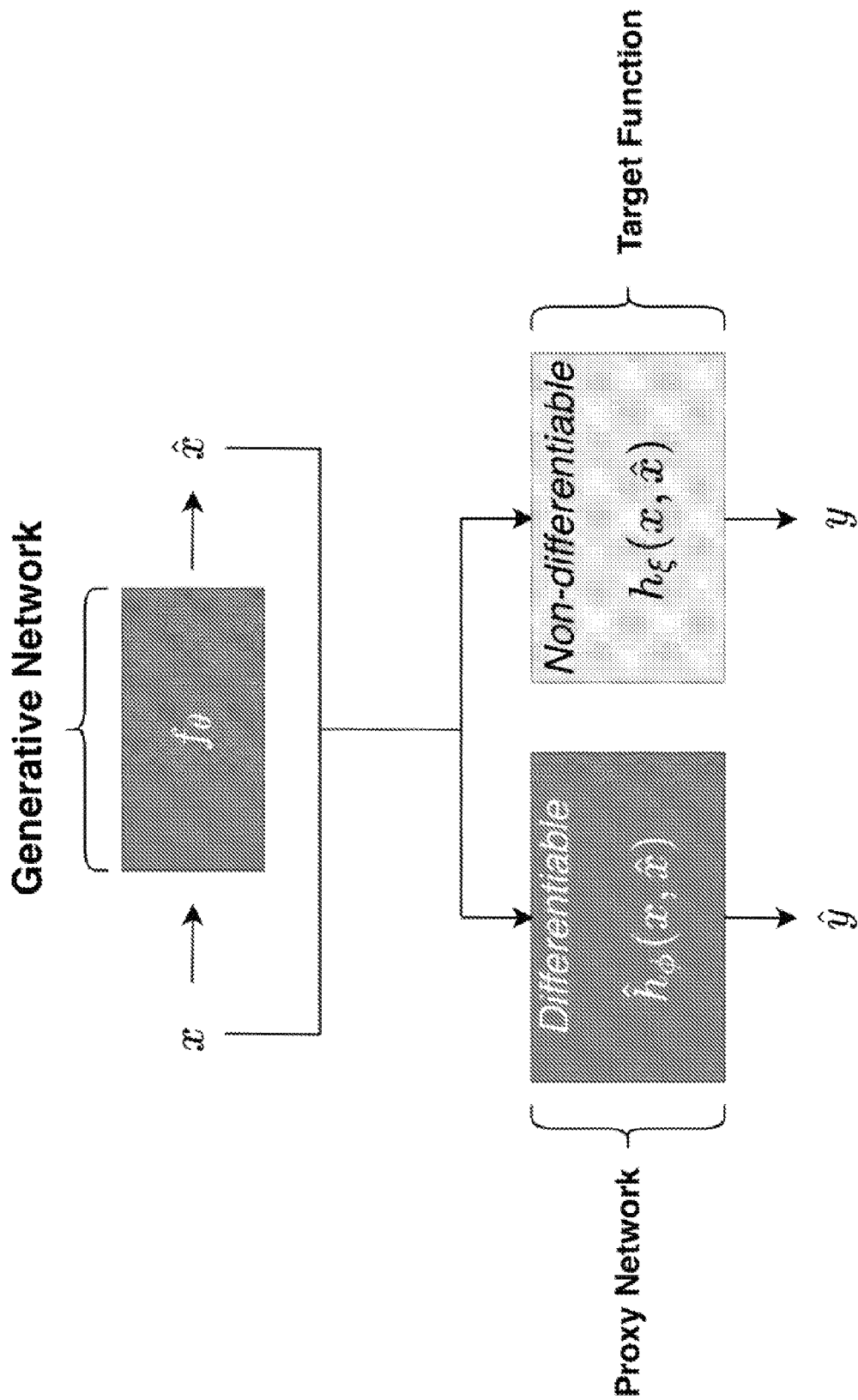
FIG. 1 shows an example of a generative network $f_\theta(x)=\hat{x}$, and a differentiable proxy network $\hat{h}_\varphi(x, \hat{x})=\hat{y}$ which approximates a non-differentiable target function (GIF) $h_\xi(x, \hat{x})=y$. Note, we can train both networks $f_\theta$ and $\hat{h}_\varphi$ at the same time.

We provide a high level overview of some aspects of our artificial intelligence (AI)-based (e.g. image and/or video) compression technology.

In general, compression can be lossless, or lossy. In lossless compression, and in lossy compression, the file size is reduced. The file size is sometimes referred to as the "rate".

But in lossy compression, it is possible to change what is input. The output image $\hat{x}$ after reconstruction of a bitstream relating to a compressed image is not the same as the input image $x$. The fact that the output image $\hat{x}$ may differ from the input image $x$ is represented by the hat over the "x". The difference between $x$ and $\hat{x}$ may be referred to as "distortion", or "a difference in image quality". Lossy compression may be characterized by the "output quality", or "distortion".

Although our pipeline may contain some lossless compression, overall the pipeline uses lossy compression.

Usually, as the rate goes up, the distortion goes down. A relation between these quantities for a given compression scheme is called the "rate-distortion equation". For example, a goal in improving compression technology is to obtain reduced distortion, for a fixed size of a compressed file, which would provide an improved rate-distortion equation. For example, the distortion can be measured using the mean square error (MSE) between the pixels of $x$ and $\hat{x}$, but there are many other ways of measuring distortion, as will be clear to the person skilled in the art. Known compression and decompression schemes include for example, JPEG, JPEG2000, AVC, HEVC, AVI.

In an example, our approach includes using deep learning and AI to provide an improved compression and decompression scheme, or improved compression and decompression schemes.

In an example of an artificial intelligence (AI)-based compression process, an input image $x$ is provided. There is provided a neural network characterized by a function $E(\ldots)$ which encodes the input image $x$. This neural network $E(\ldots)$ produces a latent representation, which we call $w$. The latent representation is quantized to provide $\hat{w}$, a quantized latent. The quantized latent goes to another neural network characterized by a function $D(\ldots)$ which is a decoder. The decoder provides an output image, which we call $\hat{x}$. The quantized latent $w$ is entropy-encoded into a bitstream.

For example, the encoder is a library which is installed on a user device, e.g. laptop computer, desktop computer, smart phone. The encoder produces the $w$ latent, which is quantized to $\hat{w}$, which is entropy encoded to provide the bitstream, and the bitstream is sent over the internet to a recipient device. The recipient device entropy decodes the bitstream to provide $\hat{w}$, and then uses the decoder which is a library installed on a recipient device (e.g. laptop computer, desktop computer, smart phone) to provide the output image $\hat{x}$.

$E$ may be parametrized by a convolution matrix $\Theta$ such that $w=E_\Theta(x)$.

$D$ may be parametrized by a convolution matrix $\Omega$ such that $\hat{x}=D_\Omega(\hat{w})$.

We need to find a way to learn the parameters $\Theta$ and $\Omega$ of the neural networks.

The compression pipeline may be parametrized using a loss function L. In an example, we use back-propagation of gradient descent of the loss function, using the chain rule, to update the weight parameters $\Theta$ and $\Omega$ of the neural networks using the gradients $\partial L/\partial y$.

The loss function is the rate-distortion trade off. The distortion function is $\mathcal{D}(x, \hat{x})$, which produces a value, which is the loss of the distortion $L_\mathcal{D}$. The loss function can be used to back-propagate the gradient to train the neural networks.

So for example, we use an input image, we obtain a loss function, we perform a backwards propagation, and we train the neural networks. This is repeated for a training set of input images, until the pipeline is trained. The trained neural networks can then provide good quality output images.

An example image training set is the KODAK image set (e.g. at www.cs.albany.edu/~xypan/research/snr/Kodak.html). An example image training set is the IMAX image set. An example image training set is the Imagenet dataset (e.g. at www.image-net.org/download). An example image training set is the CLIC Training Dataset P ("professional") and M ("mobile") (e.g. at http://challenge.compression.cc/tasks/).

In an example, the production of the bitstream from w is lossless compression.

In the pipeline, the pipeline needs a loss that we can use for training, and the loss needs to resemble the rate-distortion trade off.

A loss which may be used for neural network training is Loss=$\mathcal{D}$+$\lambda$*R, where $\mathcal{D}$ is the distortion function, $\lambda$ is a weighting factor, and R is the rate loss. R is related to entropy. Both $\mathcal{D}$ and R are differentiable functions.

Distortion functions $\mathcal{D}$ (x, $\hat{x}$), which correlate well with the human vision system, are hard to identify. There exist many candidate distortion functions, but typically these do not correlate well with the human vision system, when considering a wide variety of possible distortions.

We want humans who view picture or video content on their devices, to have a pleasing visual experience when viewing this content, for the smallest possible file size transmitted to the devices. So we have focused on providing improved distortion functions, which correlate better with the human vision system. Modern distortion functions very often contain a neural network, which transforms the input and the output into a perceptual space, before comparing the input and the output. The neural network can be a generative adversarial network (GAN) which performs some hallucination. There can also be some stabilization. It turns out it seems that humans evaluate image quality over density functions.

Hallucinating is providing fine detail in an image, which can be generated for the viewer, where all the fine, higher spatial frequencies, detail does not need to be accurately transmitted, but some of the fine detail can be generated at the receiver end, given suitable cues for generating the fine details, where the cues are sent from the transmitter.

Figure 11:
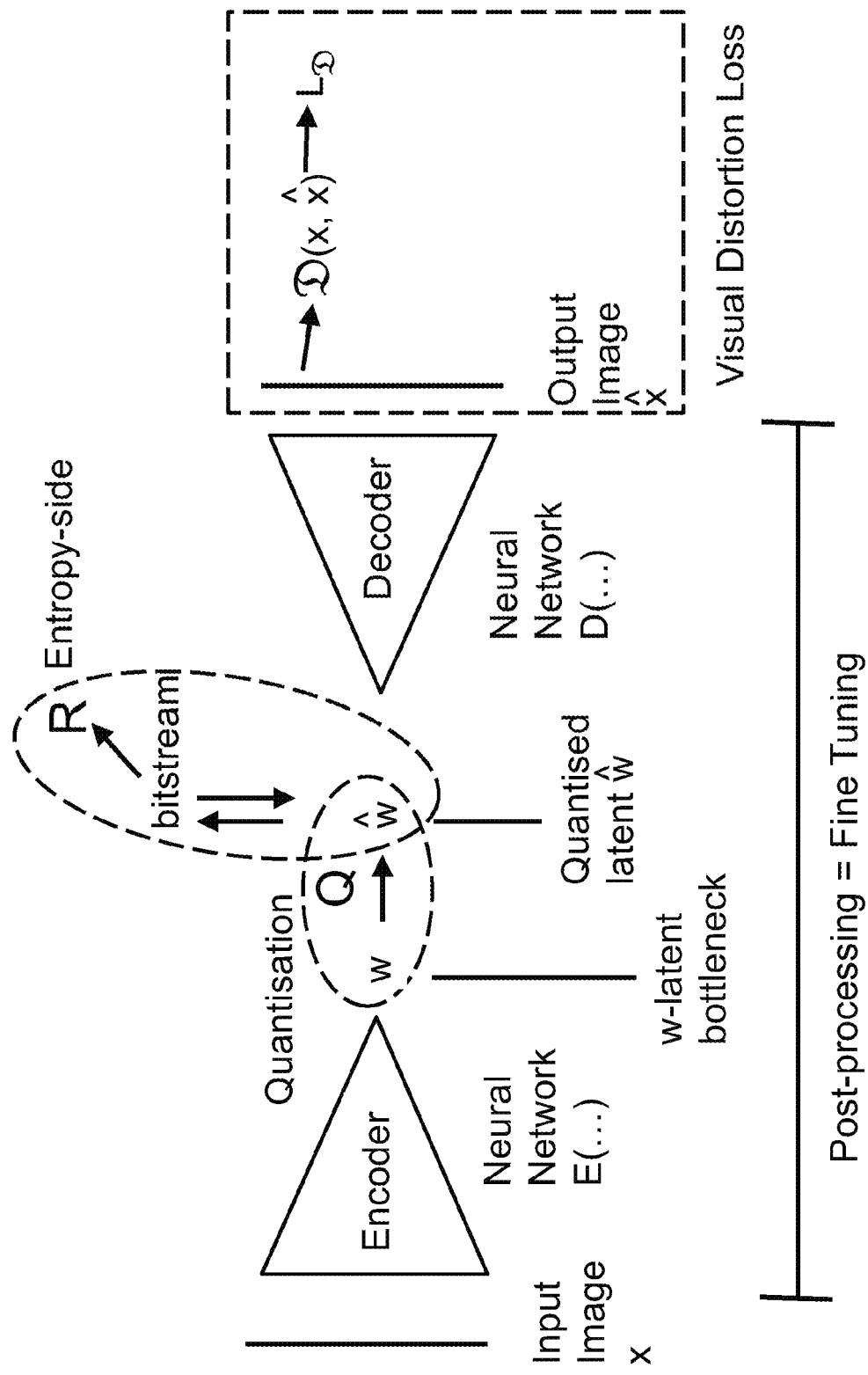
FIG. 11 shows a schematic diagram of an artificial intelligence (AI)-based compression process, including encoding an input image $x$ using a neural network $E(\ldots)$, and decoding using a neural network $D(\ldots)$, to provide an output image $\hat{x}$. Runtime issues are relevant to the Encoder. Runtime issues are relevant to the Decoder. Examples of issues of relevance to parts of the process are identified.

FIG. 11 shows a schematic diagram of an artificial intelligence (AI)-based compression process, including encoding an input image x using a neural network, and decoding using a neural network, to provide an output image x.

In an example of a layer in an encoder neural network, the layer includes a convolution, a bias and an activation function. In an example, four such layers are used.

There is provided a computer-implemented method for lossy image or video compression, transmission and decoding, the method including the steps of:
(i) receiving an input image at a first computer system;
(ii) encoding the input image using a first trained neural network, using the first computer system, to produce a latent representation;
(iii) quantizing the latent representation using the first computer system to produce a quantized latent;
(iv) entropy encoding the quantized latent into a bitstream, using the first computer system;
(v) transmitting the bitstream to a second computer system;
(vi) the second computer system entropy decoding the bitstream to produce the quantized latent;
(vii) using the second computer system using a second trained neural network to produce an output image from the quantized latent, wherein the output image is an approximation of the input image. A related system including a first computer system, a first trained neural network, a second computer system and a second trained neural network, may be provided.

An advantage is that for a fixed file size ("rate"), a reduced output image distortion is obtained. An advantage is that for a fixed output image distortion, a reduced file size ("rate") is obtained.

There is provided a computer implemented method of training a first neural network and a second neural network, the neural networks being for use in lossy image or video compression, transmission and decoding, the method including the steps of:
(i) receiving an input training image;
(ii) encoding the input training image using the first neural network, to produce a latent representation;
(iii) quantizing the latent representation to produce a quantized latent;
(iv) using the second neural network to produce an output image from the quantized latent, wherein the output image is an approximation of the input image;
(v) evaluating a loss function based on differences between the output image and the input training image;
(vi) evaluating a gradient of the loss function;
(vii) back-propagating the gradient of the loss function through the second neural network and through the first neural network, to update weights of the second neural network and of the first neural network; and
(viii) repeating steps (i) to (vii) using a set of training images, to produce a trained first neural network and a trained second neural network, and
(ix) storing the weights of the trained first neural network and of the trained second neural network. A related computer program product may be provided.

An advantage is that, when using the trained first neural network and the trained second neural network, for a fixed file size ("rate"), a reduced output image distortion is obtained; and for a fixed output image distortion, a reduced file size ("rate") is obtained.

Example Aspects of Adversarial Learning of Differentiable Proxy of Gradient Intractable Networks A generative network $f_\theta$ which generates an output image $\hat{x}$ from an input image x is provided. A differentiable proxy network $\hat{h}_\phi$ which generates a function output $\hat{y}$ from x and $\hat{x}$ according to $\hat{h}_\phi(x, \hat{x})=\hat{y}$ is provided. The differentiable proxy network $\hat{h}_\phi$ approximates a non-differentiable target function (GIF) $h_\xi$ which generates a function output y from x and $\hat{x}$ according to $h_\xi(x, \hat{x})=y$. It is possible to train both networks $f_\theta$ and $\hat{h}_\phi$ at the same time. An example is shown in FIG. 1.

Figure 2A:
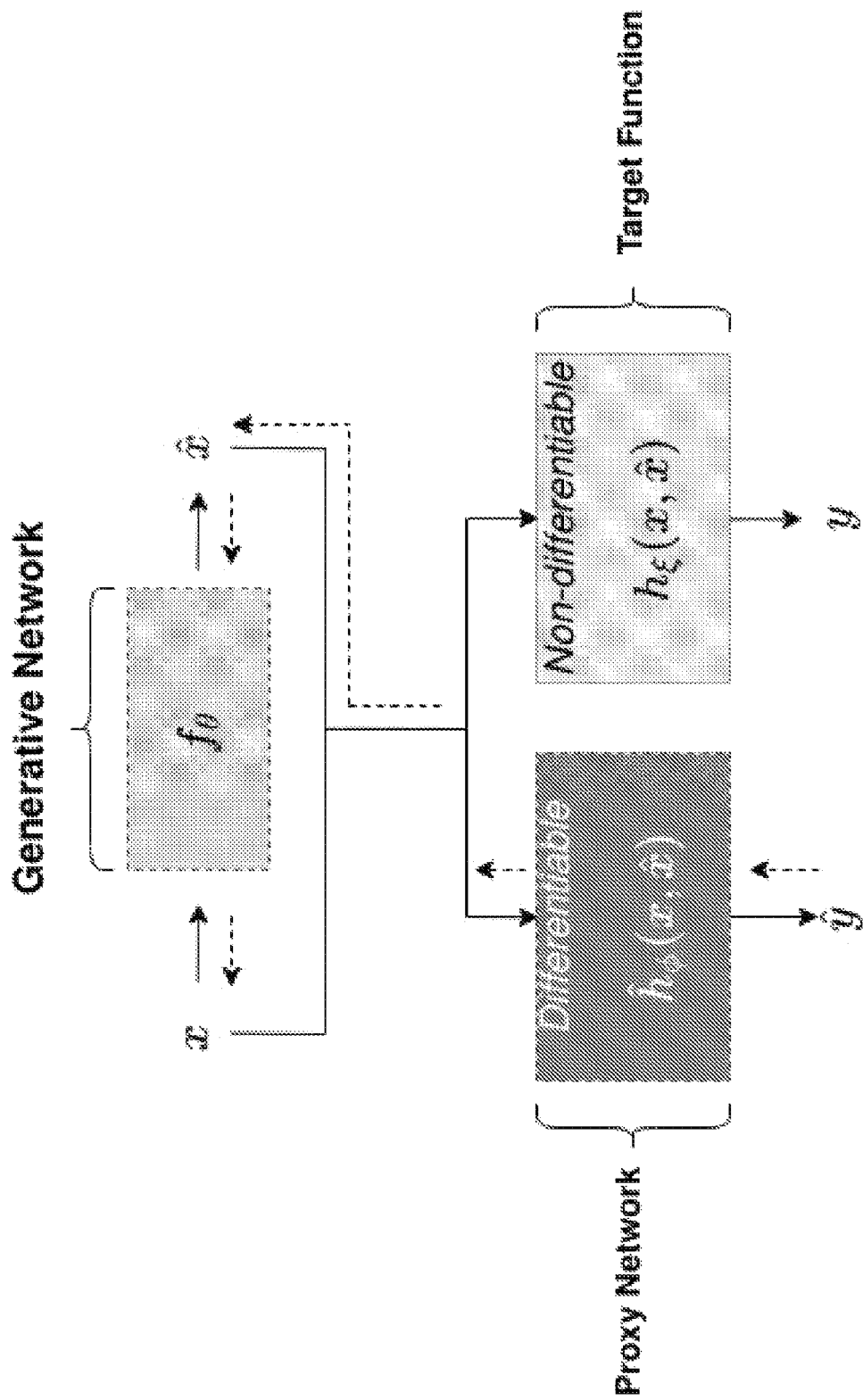
FIG. 2A shows an example in which a training of $f_\theta$ requires gradient flow via $\hat{h}_\varphi$ and parameter updates from the optimiser opt$\{f_\theta\}$. The dotted arrows indicate schematically the direction of back-propagation.

In an example, a training of $f_\theta$ requires gradient flow via $\hat{h}_\phi$ and parameter updates for $f_\theta$ from an optimiser opt$\{f_\theta\}$. An example is shown in FIG. 2A, in which the dotted arrows indicate schematically the direction of back-propagation.

Figure 2B:
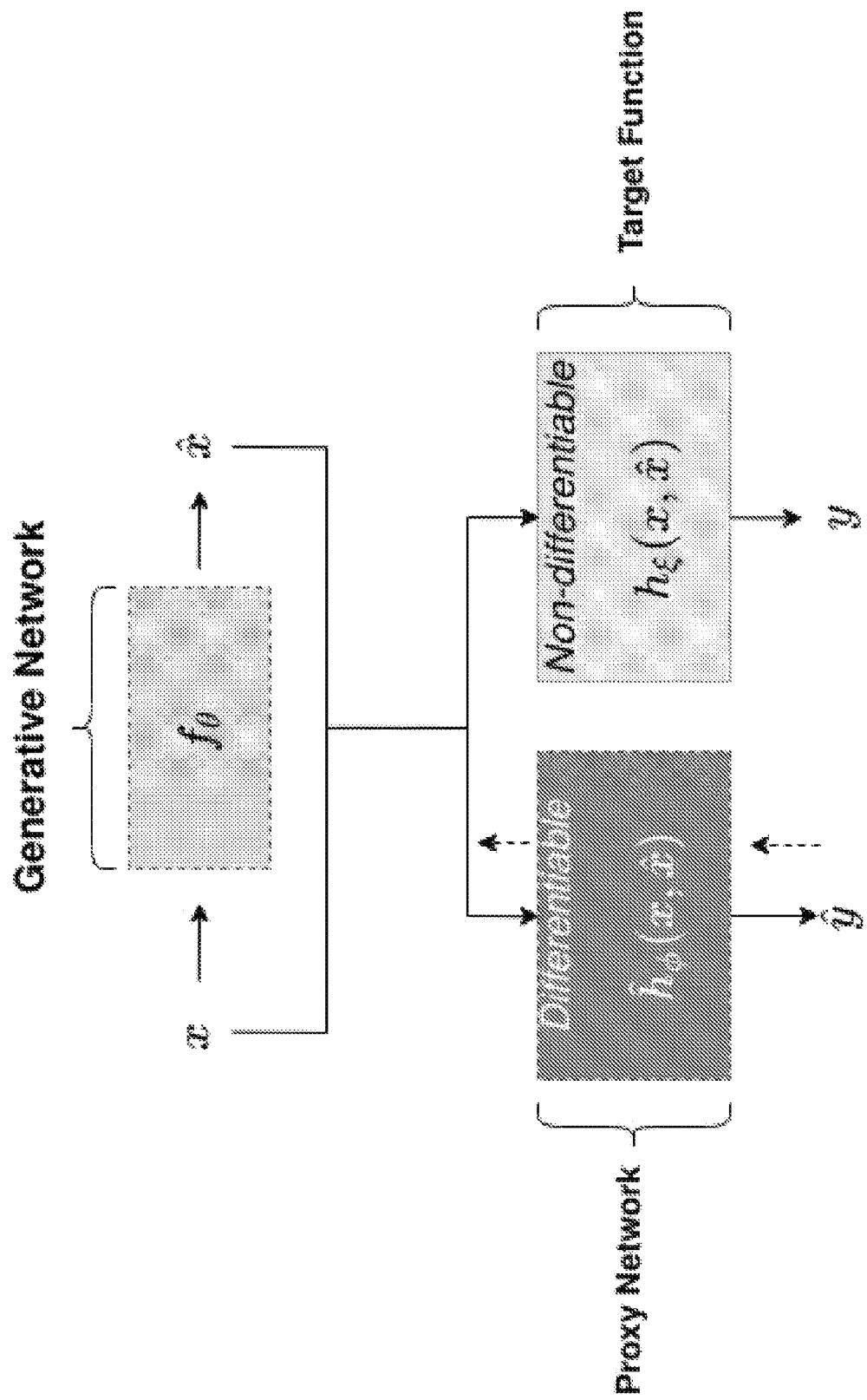
FIG. 2B shows an example in which a training of $\hat{h}_\varphi$ involves samples of $f_\theta(x)$ and x, but does not require gradients for $\hat{x}$. $\hat{h}_\varphi$ is trained to minimise the loss $L_{proxy}(\hat{y},y)$ with optimizer opt$\{\hat{h}_\varphi\}$. The dotted arrows indicate schematically the direction of back-propagation.
Figure 3:
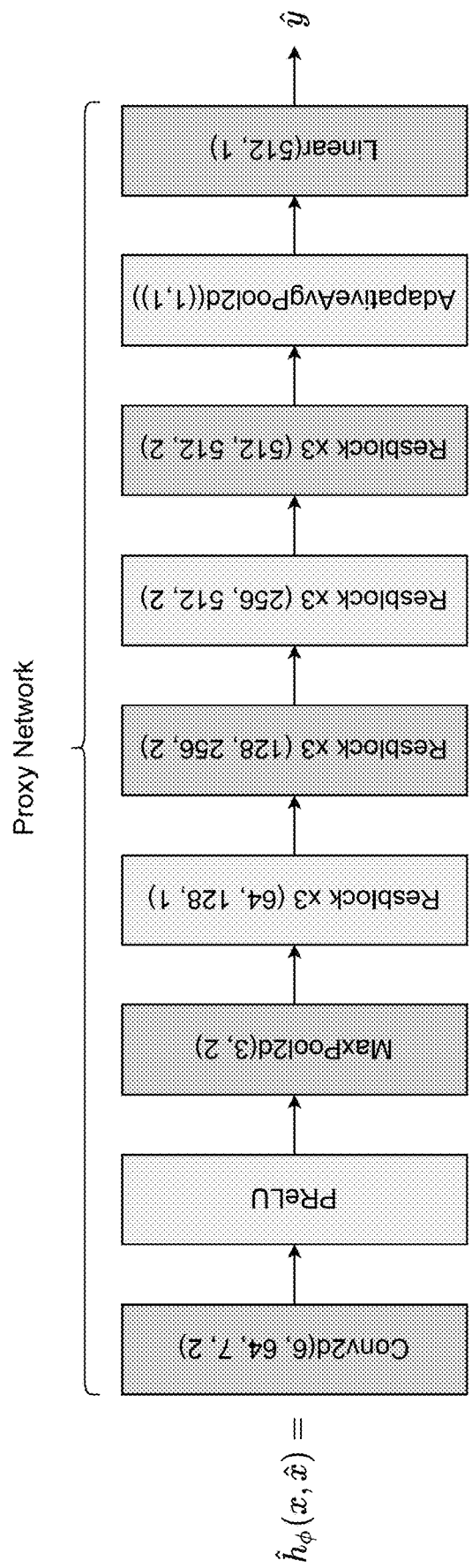
FIG. 3 shows an example of a structure of a proxy network $\hat{h}_\varphi(x, \hat{x})=y$.
Figure 4:
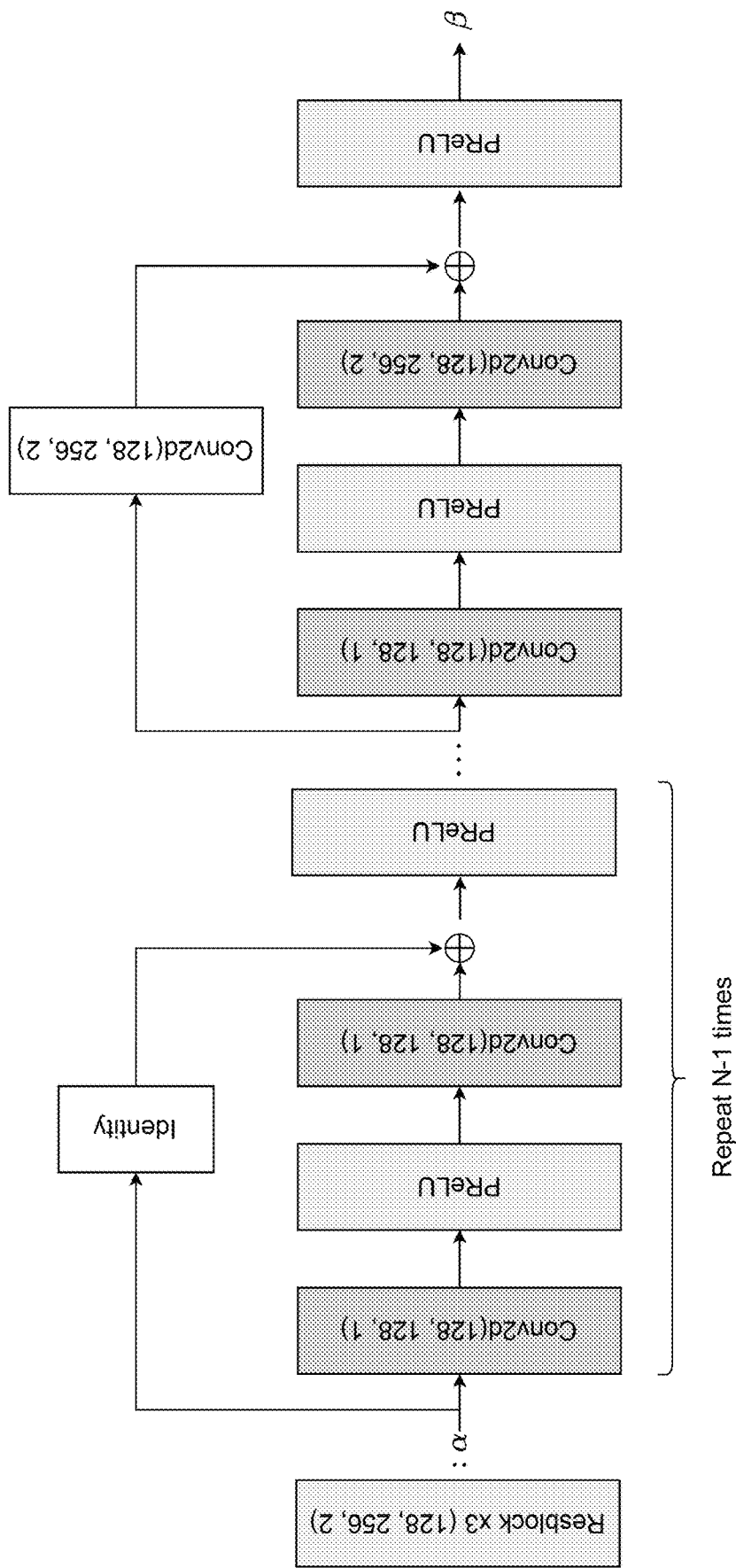
FIG. 4 shows an example of a resblock component with 3 internal blocks (x3). For example "(128, 256, 2)" indicates there are 128 channels in $\alpha$, 256 channels in $\beta$ and "2" indicates a stride of 2 is used to downsample at the end of the sequence. The circle with a "+" at its centre indicates element-wise addition. For example "Conv2d(128, 128, 1)" indicates a 2D convolutional operation of input channels of size 128, output channels of size 128, stride of 1 and a default padding of size stride/2.

In an example, a training of $\hat{h}_\phi$ involves samples of $f_\theta(x)$ and x, but does not require gradients for $\hat{x}$. $\hat{h}_\phi$ is trained to minimise the loss $L_{proxy}(\hat{y},y)$ with optimizer opt$\{\hat{h}_\phi\}$. An example is shown in FIG. 2B, in which the dotted arrows indicate schematically the direction of back-propagation.

Figure 5:
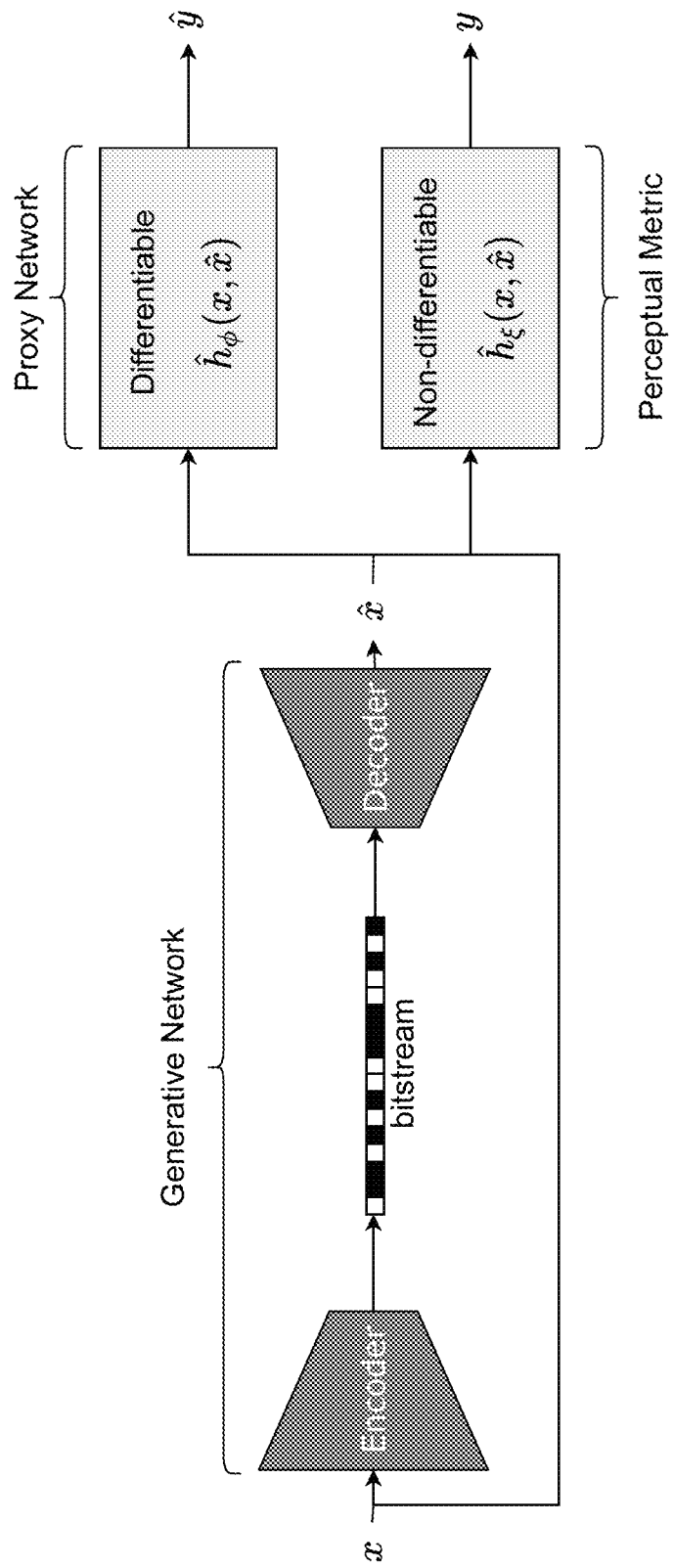
FIG. 5 shows an example in which an auto-encoder is the generative network of FIG. 1.

A generative network $f_\theta$ which generates an output image $\hat{x}$ from an input image x is provided. In an example, the generative network $f_\theta$ includes an encoder, which encodes (e.g. which performs lossy encoding) an input image x into a bitstream, and includes a decoder, which decodes the bitstream into an output image $\hat{x}$. A differentiable proxy network $\hat{h}_\phi$ which generates a function output $\hat{y}$ from x and $\hat{x}$ according to $\hat{h}_\phi(x, \hat{x})=\hat{y}$ is provided. The differentiable proxy network $\hat{h}_\phi$ approximates a non-differentiable target function (GIF) $h_\xi$ which generates a function output y from x and $\hat{x}$ according to $h_\xi(x, \hat{x})=y$. It is possible to train both networks $f_\theta$ and $\hat{h}_\phi$ at the same time. An example is shown in FIG. 5.

Figure 6:
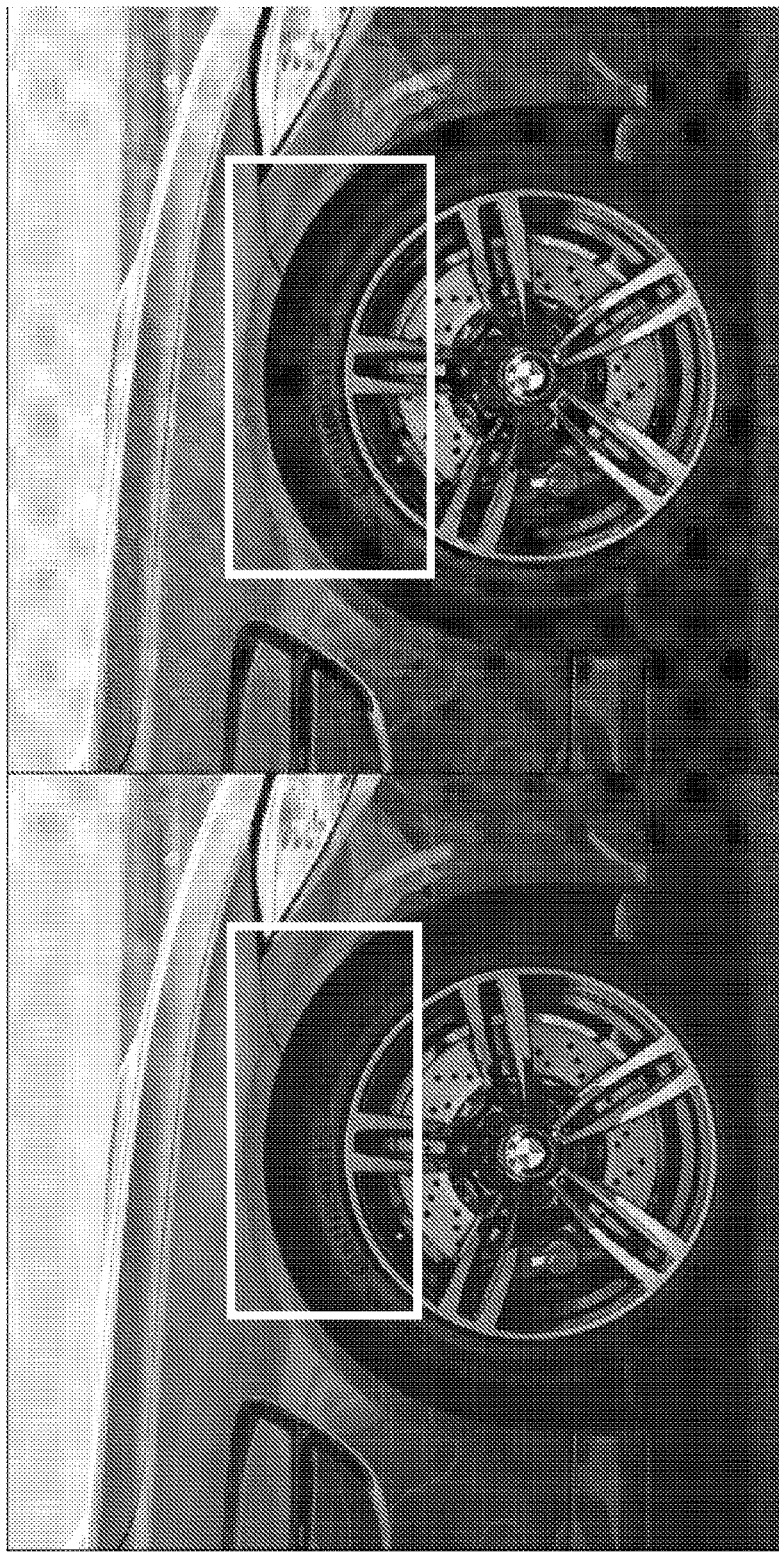
FIG. 6 shows an example of adversarial samples generated by a generative network $f_\theta$ where $h_\xi$ is VMAF. The white bounding boxes indicate the corresponding enlarged regions in FIG. 7. Note that the distorted image has a VMAF score of 85 out of approximately 96.
Figure 7:
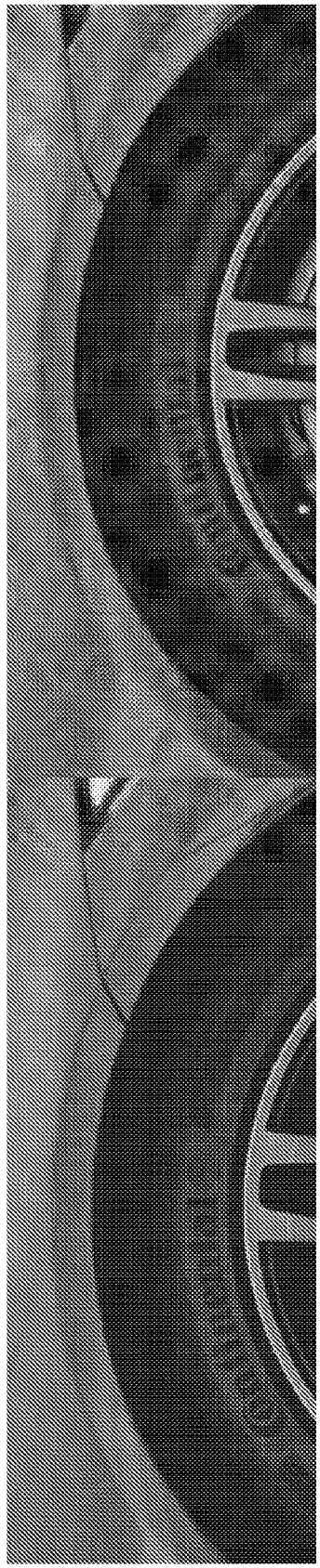
FIG. 7 shows an example of adversarial samples generated by the generative network $f_\theta$ where $h_\xi$ is VMAF. The images shown in the figure are enlarged views of the corresponding regions contained within the white bounding boxes shown in FIG. 6. Notice the checkerboard-like artifacts in the distorted image which have been learnt by the generative network $f_\theta$ as a method of minimizing the loss corresponding to $f_\theta$ because VMAF is susceptible to these types of artifacts which are possibly outside the boundary for which the function is well-defined, i.e. these artifacts align well with human perception, and the generative network $f_\theta$ considers images with these artifacts perceptually more similar. The distorted image is referred to as an adversarial sample.

Adversarial samples may be generated by a generative network $f_\theta$ where $h_\xi$ is VMAF. FIG. 6 shows an example of adversarial samples generated by a generative network $f_\theta$ where $h_\xi$ is VMAF. The white bounding boxes indicate the corresponding enlarged regions in FIG. 7. Note that the distorted image has a VMAF score of 85 out of approximately 96.

Figure 8:
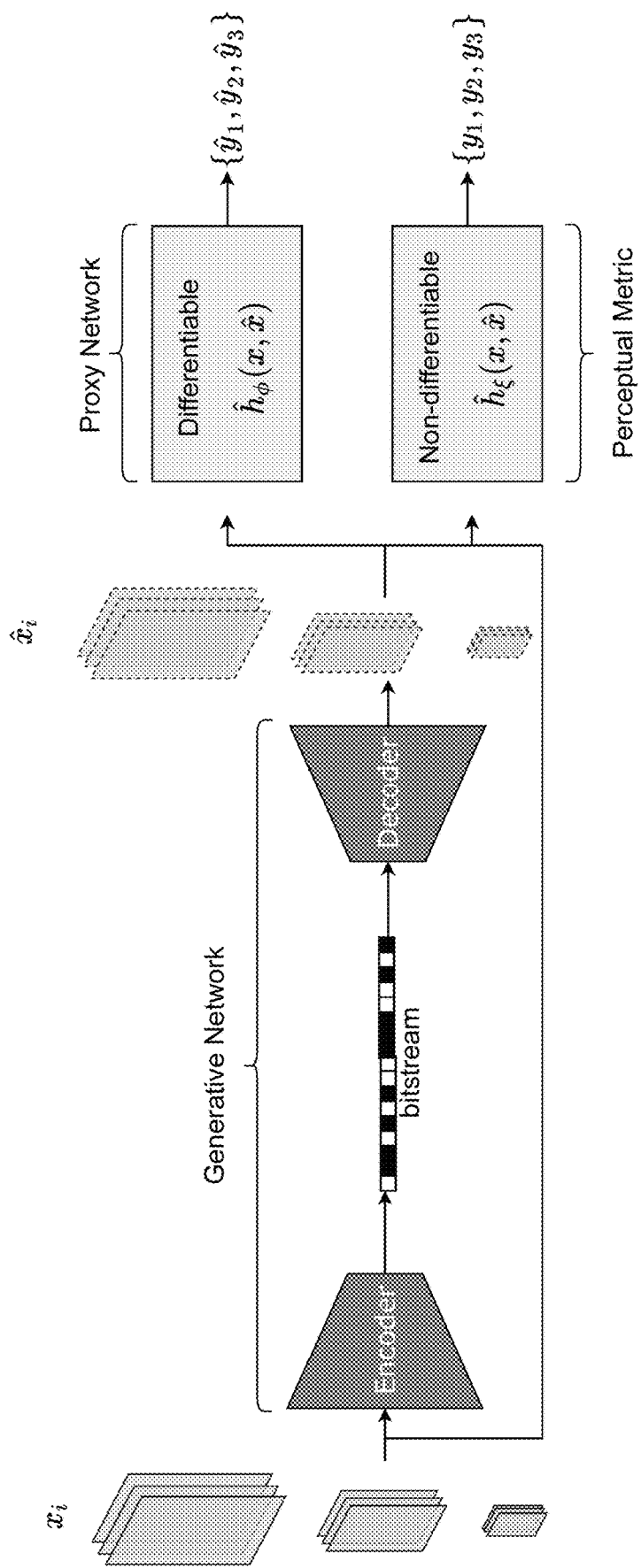
FIG. 8 shows an example of multiscale training for the case of images $x \in \mathfrak{R}^3$ where for each image $x$, an RGB image at three different scales is provided. The generative network, along with the proxy and perceptual metric process each scale of image and perform an aggregation at the end using some function, such as a mean operator.

A generative network $f_\theta$ which generates an output image $\hat{x}_i$ from an input image $x_i$ is provided. In an example, the generative network $f_\theta$ includes an encoder, which encodes (e.g. which performs lossy encoding) an input image $x_i$ into a bitstream, and includes a decoder, which decodes the bitstream into an output image $\hat{x}_i$. A differentiable proxy network $\hat{h}_\phi$ which generates a function output $\hat{y}_i$ from $x_i$ and $\hat{x}_i$, according to $\hat{h}_\phi(x_i, \hat{x}_i)=\hat{y}_i$ is provided. The differentiable proxy network $\hat{h}_\phi$ approximates a non-differentiable target function (GIF) $h_\xi$ which generates a function output $y_i$ from $x_i$ and $\hat{x}_i$ according to $h_\xi(x_i, \hat{x}_i)=y_i$. It is possible to train both networks $f_\theta$ and $\hat{h}_\phi$ at the same time. Multiscale training is provided for the case of multiscale images $x_i \in \mathfrak{R}^3$ where for each image x, an RGB image at a plurality of different scales is used. The generative network $f_\theta$, along with the proxy network $\hat{h}_\phi$ and the perceptual metric $h_\xi$ process each scale of image and finally perform an aggregation using some aggregation function, such as a mean operator. FIG. 8 shows an example of multiscale training for the case of images $x_i \in \mathfrak{R}^3$ where for each image x, an RGB image at three different scales is provided: $x_i$, where i=1, 2 or 3.

Figure 9:
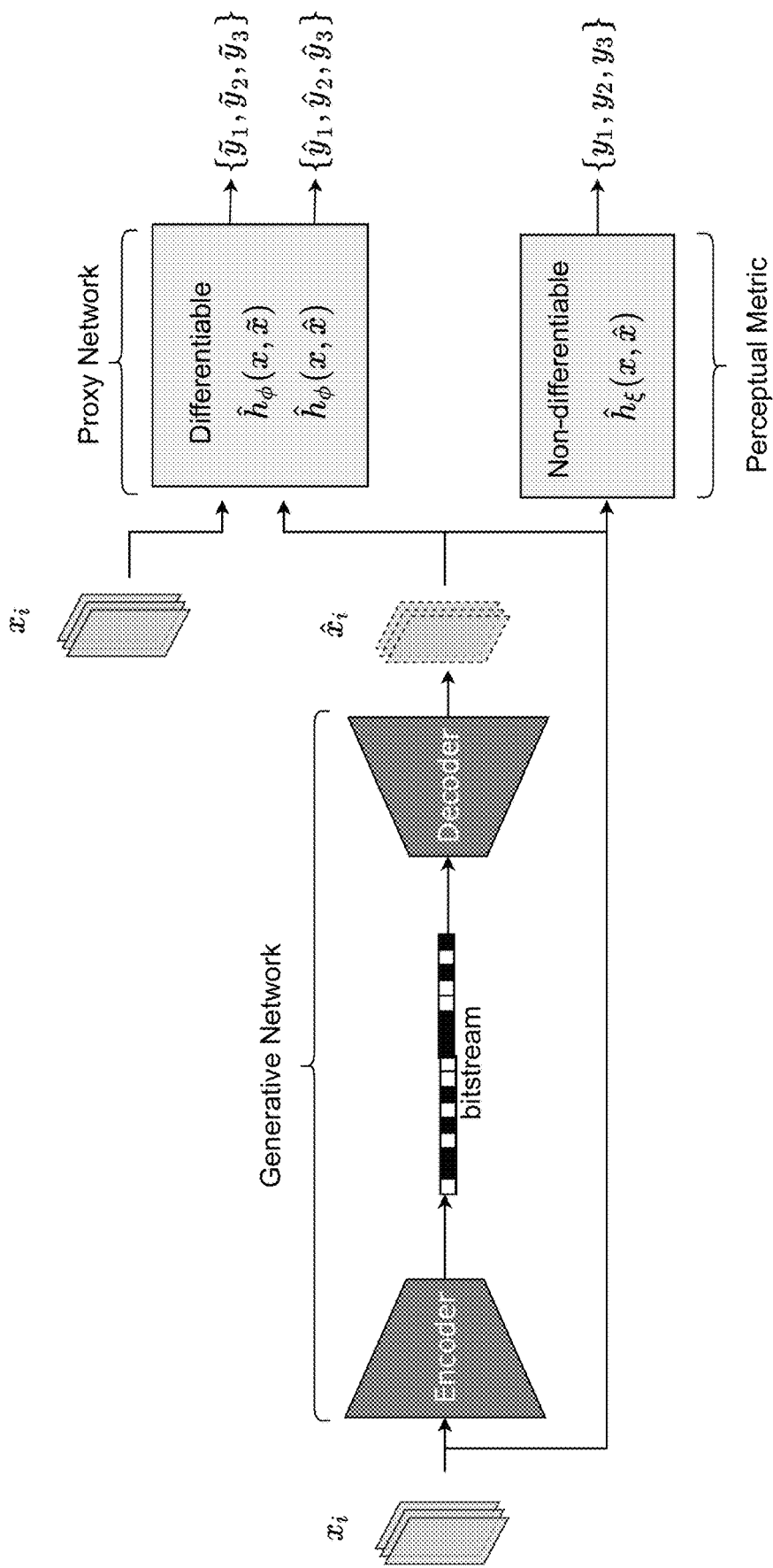
FIG. 9 shows a training example in which a set of adversarial samples $\tilde{x}_i$ is introduced, with associated labels $\tilde{y}_i$. The loss surface of $\hat{h}_\varphi$ is directly discouraged to enter blind spots by training against the sample set $\tilde{x}_i$ with self-imposed label set $\tilde{y}$.

A generative network $f_\theta$ which generates an output image $\hat{x}_i$ from an input image $x_i$ is provided. In an example, the generative network $f_\theta$ includes an encoder, which encodes (e.g. which performs lossy encoding) an input image $x_i$ into a bitstream, and includes a decoder, which decodes the bitstream into an output image $\hat{x}_i$. A differentiable proxy network $\hat{h}_\phi$ which generates a function output $\hat{y}_i$ from $x_i$ and $\hat{x}_i$ according to $\hat{h}_\phi(x_i, \hat{x}_i)=\hat{y}_i$ is provided. The differentiable proxy network $\hat{h}_\phi$ approximates a non-differentiable target function (GIF) $h_\xi$ which generates a function output $y_i$ from $x_i$ and $\hat{x}_i$ according to $h_\xi(x_i, \hat{x}_i)=y_i$. It is possible to train both networks $f_\theta$ and $\hat{h}_\phi$ at the same time. Multiscale training is provided for the case of multiscale images $x_i \in \mathfrak{R}^3$ where for each image x, an RGB image at a plurality of different scales is used. The generative network $f_\theta$, along with the proxy network $\hat{h}_\phi$ and the perceptual metric $h_\xi$ process each scale of image and finally perform an aggregation using some aggregation function, such as a mean operator. In an example, a set of adversarial samples $\tilde{x}_i$ is introduced, with associated labels $\tilde{y}_i$, which are generated according to $\hat{h}_\phi(x_i, \tilde{x}_i)=\tilde{y}_i$. The loss surface of $\hat{h}_\phi$ is directly discouraged to enter blind spots by training against the sample set $\tilde{x}_i$ with self-imposed label set $\tilde{y}_i$. FIG. 9 shows a training example in which a set of adversarial samples $\tilde{x}_i$ is introduced, with associated labels $\tilde{y}_i$, and the loss surface of $\hat{h}_\phi$ is directly discouraged to enter blind spots by training against the sample set $\tilde{x}_i$ with self-imposed label set $\tilde{y}_i$.

Figure 10:
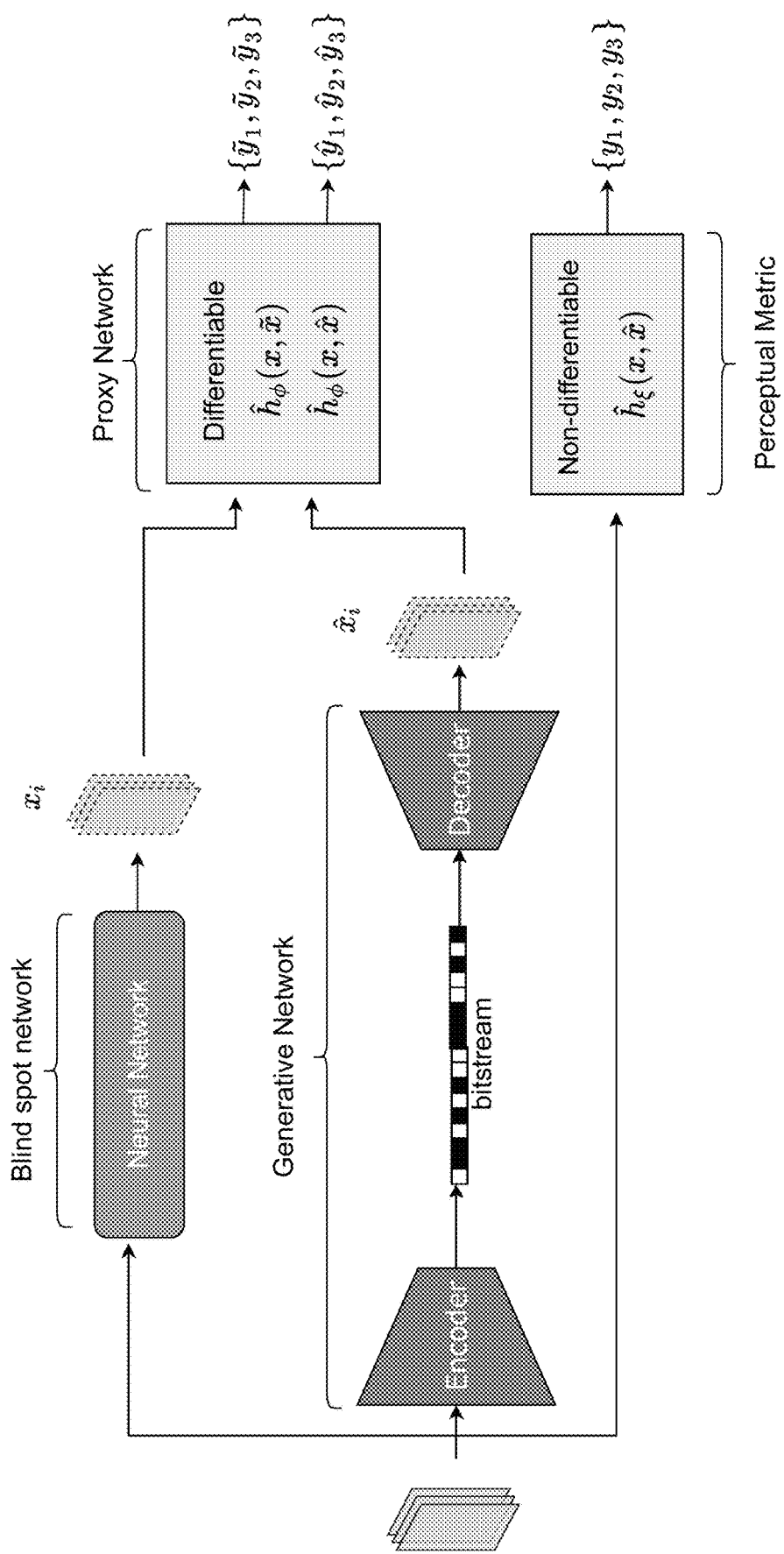
FIG. 10 shows a training example in which a blind spot network is introduced, with associated outputs $\tilde{x}_i$. The loss surface of $\hat{h}_\varphi$ is directly discouraged to enter boundaries of blind spots by training against the samples from the blind spot network with self-imposed labels $\tilde{y}_i$. The blind spot network itself is trained using a proxy network. The blind spot network can either use the same (as in this figure) or a different proxy network (not shown) from the encoder decoder network.

A generative network $f_\theta$ which generates an output image $\hat{x}_i$ from an input image $x_i$ is provided. In an example, the generative network $f_\theta$ includes an encoder, which encodes (e.g. which performs lossy encoding) an input image $x_i$ into a bitstream, and includes a decoder, which decodes the bitstream into an output image $\hat{x}_i$. A differentiable proxy network $\hat{h}_\phi$ which generates a function output $\hat{y}_i$ from $x_i$ and $\hat{x}_i$ according to $\hat{h}_\phi(x_i, \hat{x}_i)=\hat{y}_i$ is provided. The differentiable proxy network $\hat{h}_\phi$ approximates a non-differentiable target function (GIF) $h_\xi$ which generates a function output $y_i$ from $x_i$ and $\hat{x}_i$ according to $h_\xi(x_i, \hat{x}_i)=y_i$. It is possible to train both networks $f_\theta$ and $\hat{h}_\phi$ at the same time. Multiscale training may be provided for the case of multiscale images $x_i \in \mathfrak{R}^3$ where for each image x, an RGB image at a plurality of different scales is used. The generative network $f_\theta$, along with the proxy network $\hat{h}_\phi$ and the perceptual metric $h_\xi$ process each scale of image and finally perform an aggregation using some aggregation function, such as a mean operator. In an example, a set of adversarial samples $\tilde{x}_i$ are generated by a blind spot network from a set of $x_i$. The $\tilde{x}_i$ have associated labels $\tilde{y}_i$, which are generated according to $\hat{h}_\phi(x_i, \tilde{x}_i)=\tilde{y}_i$. The loss surface of $\hat{h}_\phi$ is directly discouraged to enter blind spots by training against the sample set $\tilde{x}_i$ with self-imposed label set $\tilde{y}_i$. The blind spot network itself may be trained using a proxy network. The blind spot network can either use the same (as in FIG. 10) or a different proxy network (not shown in FIG. 10) from the encoder decoder network. FIG. 10 shows a training example in which a blind spot network is present.

In an example of a trained generative network, an encoder including a first trained neural network is provided on a first computer system, and a decoder is provided on a second computer system in communication with the first computer system, the decoder including a second trained neural network. The encoder produces a bitstream from an input image; the bitstream is transmitted to the second computer system, where the decoder decodes the bitstream to produce an output image. The output image may be an approximation of the input image.

The first computer system may be a server, e.g. a dedicated server, e.g. a machine in the cloud with dedicated GPUs e.g. Amazon Web Services, Microsoft Azure, etc, or any other cloud computing services.

The first computer system may be a user device. The user device may be a laptop computer, desktop computer, a tablet computer or a smart phone.

The first trained neural network may include a library installed on the first computer system.

The first trained neural network may be parametrized by one or several convolution matrices $\Theta$, or the first trained neural network may be parametrized by a set of bias parameters, non-linearity parameters, convolution kernel/matrix parameters.

The second computer system may be a recipient device.

The recipient device may be a laptop computer, desktop computer, a tablet computer, a smart TV or a smart phone.

The second trained neural network may include a library installed on the second computer system.

The second trained neural network may be parametrized by one or several convolution matrices $\Omega$, or the second trained neural network may be parametrized by a set of bias parameters, non-linearity parameters, convolution kernel/matrix parameters.

Notes Re VMAF

Video Multimethod Assessment Fusion (VMAF) is an objective full-reference video quality metric. It predicts subjective video quality based on a reference and distorted video sequence. The metric can be used to evaluate the quality of different video codecs, encoders, encoding settings, or transmission variants.

VMAF uses existing image quality metrics and other features to predict video quality:
Visual Information Fidelity (VIF): considers information fidelity loss at four different spatial scales.
Detail Loss Metric (DLM): measures loss of details, and impairments which distract viewer attention.
Mean Co-Located Pixel Difference (MCPD): measures temporal difference between frames on the luminance component.
Anti-noise signal-to-noise ratio (AN-SNR).

The above features are fused using a support-vector machine (SVM)-based regression to provide a single output score in the range of 0-100 per video frame, with 100 being quality identical to the reference video. These scores are then temporally pooled over the entire video sequence using the arithmetic mean to provide an overall differential mean opinion score (DMOS).

Due to the public availability of the training source code ("VMAF Development Kit", VDK), the fusion method can be re-trained and evaluated based on different video datasets and features.

Regarding perceptual specific GIF's, some other examples apart from VMAF are:
VIF—Visual Information Fidelity
DLM—Detail Loss Metric
IFC—Information Fidelity Criterion.

Regarding perceptual specific GIF's, an example class of GIFs is mutual information based estimators.

Notes Re Training

Regarding seeding the neural networks for training, all the neural network parameters can be randomized with standard methods (such as Xavier Initialization). Typically, we find that satisfactory results are obtained with sufficiently small learning rates.

Other Applications

As an alternative to applications described in this document which use a gradient intractable perceptual metric, the present invention may be re-purposed for applications relating to quantisation. In an application relating to quantisation, we can use a proxy network to learn any intractable gradient function in machine learning. So as an alternative to the perceptual metric, the quantisation (round) function may be used. A quantisation (round) function may be used in our pipeline on the latent space to convert it to a quantised latent space during encoding. This is a problem for training as a quantisation (round) function does not have usable gradients. It is possible to learn the quantisation (round) function using a proxy neural network (since we always know the ground truth values) and use this network (which allows gradients to be propagated) for quantisation during training. The method is similar to that described in the algorithms 1.1, 1.2 and 1.3, but the intractable gradient function is now the quantisation (round) function.

As an alternative to applications described in this document which use a gradient intractable perceptual metric, the present invention may be re-purposed for applications relating to a runtime device proxy. Techniques such as NAS (Network Architecture Search) can be used to drive the search for efficient architecture using the measured runtime on a device as the loss function to minimise. However, this is currently not possible as it's too time-consuming to execute each model on a device to assess its runtime per iteration of training. We use a proxy network to learn the mapping from architecture to runtime. This proxy is trained by generating 1000, or at least 1000, architectures randomly, timing their runtime on a device, and then fitting a neural network to this data. Having this runtime proxy allows us to get runtimes of architecture easily and within a few seconds of processing (e.g. through the forward pass of the proxy network). This proxy can be then be used as a stand-alone to assess run timings of architectures or in a NAS based setting to drive learning.

Note

It is to be understood that the arrangements referenced herein are only illustrative of the application for the principles of the present inventions. Numerous modifications and alternative arrangements can be devised without departing from the spirit and scope of the present inventions. While the present inventions are shown in the drawings and fully described with particularity and detail in connection with what is presently deemed to be the most practical and preferred examples of the inventions, it will be apparent to those of ordinary skill in the art that numerous modifications can be made without departing from the principles and concepts of the inventions as set forth herein.

The invention claimed is:

1. A computer-implemented method of training an image generative network $f_\theta$ for a set of training images, in which an output image $\hat{x}$ is generated from an input image x of the set of training images non-losslessly, and in which a proxy network is trained for a gradient intractable perceptual metric that evaluates a quality of an output image $\hat{x}$ given an input image x, the method of training using a plurality of scales for input images from the set of training images, the method including the steps of:

(i) receiving an input image x of the set of training images and generating one or more images which are derived from x to make a multiscale set of images $\{x_i\}$ which includes x;

(ii) the image generative network $f_\theta$ generating an output image $\hat{x}_i$ from an input image $x_i \in \{x_i\}$, without tracking gradients for $f_\theta$;

(iii) the proxy network outputting an approximated function output $\hat{y}_i$, using the $x_i$ and the $\hat{x}_i$ as inputs;

(iv) the gradient intractable perceptual metric outputting a function output $y_i$, using the $x_i$ and the $\hat{x}_i$ as inputs;

(v) evaluating a loss for the proxy network, using the $y_i$ and the $\hat{y}_i$ as inputs, and including the evaluated loss for the proxy network in a loss array for the proxy network;

(vi) repeating steps (ii) to (v) for all the images $x_i$ in the multiscale set of images $\{x_i\}$;

(vii) using backpropagation to compute gradients of parameters of the proxy network with respect to an aggregation of the loss array assembled in executions of step (v);

(viii) optimizing the parameters of the proxy network based on the results of step (vii), to provide an optimized proxy network;

(ix) the image generative network $f_\theta$ generating an output image $\hat{x}_i$ from an input image $x_i \in \{x_i\}$;

(x) the optimized proxy network outputting an optimized approximated function output $\hat{y}_i$, using the $\hat{x}_i$ and the $\hat{x}_i$ as inputs;

(xi) evaluating a loss for the generative network $f_\theta$, using the $x_i$, the $\hat{x}_i$ and the optimized approximated function output $\hat{y}_i$ as inputs, and including the evaluated loss for the generative network $f_\theta$ in a loss array for the generative network $f_\theta$;

(xii) repeating steps (ix) to (xi) for all the images $x_i$ in the multiscale set of images $\{x_i\}$;

(xiii) using backpropagation to compute gradients of parameters of the generative network $f_\theta$ with respect to an aggregation of the loss array assembled in executions of step (xi);

(xiv) optimizing the parameters of the generative network $f_\theta$ based on the results of step (xiii), to provide an optimized generative network $f_\theta$, and (xv) repeating steps (i) to (xiv) for each member of the set of training images.

2. The method of claim 1, wherein the one or more images which are derived from x to make a multiscale set of images $\{x_i\}$ are derived by downsampling.

3. The method of claim 1, wherein the generative network $f_\theta$ includes an encoder, which encodes (by performing lossy encoding) an input image x into a bitstream, and includes a decoder, which decodes the bitstream into an output image $\hat{x}$.

4. The method of claim 1, wherein the method includes an iteration of a training pass of the generative network, and a training pass of the proxy network.

5. The method of claim 1, wherein the generative and proxy networks have separate optimizers.

6. The method of claim 1, wherein for the case of proxy network optimization, gradients do not flow through the generative network.

7. The method of claim 1, wherein the method is used for learned image or video compression.

8. The method of claim 1, wherein the gradient intractable perceptual metric is a perceptual loss function.

9. The method of claim 1, wherein the gradient intractable perceptual metric is VMAF, VIF, DLM or IFC, or a mutual information based estimator.

10. The method of claim 1, wherein the generative network includes a compression network, wherein a term is added to the total loss of the compression network to stabilise the initial training of the compression network.

11. The method of claim 1, wherein the generative loss includes a generic distortion loss which includes one or more stabilisation terms.

12. The method of claim 1, wherein the stabilisation terms include Mean Squared Error (MSE) or a combination of analytical losses with weighted deep-embeddings of a pre-trained neural network.

13. The method of claim 1, wherein a perceptual quality score is assigned to the image at each scale and is aggregated by an aggregation function.

14. The method of claim 1, wherein the set of images includes a downsampled image that has been downsampled by a factor of two in each dimension.

15. The method of claim 1, wherein the set of images includes a downsampled image that has been downsampled by a factor of four in each dimension.

16. The method of claim 1, wherein the mean of the $\hat{y}_i$ is used to train the image generative network by attempting to maximise or minimise the mean of the $\hat{y}_i$ using stochastic gradient descent.

17. The method of claim 1, wherein the predictions $y_i$ are used to train the proxy network to force its predictions to be closer to an output of the perceptual metric, using stochastic gradient descent.

18. The method of claim 1, wherein for each image x, an RGB image is provided.

19. A computer system configured to train an image generative network $f_\theta$ for a set of training images, in which the system generates an output image $\hat{x}$ from an input image x of the set of training images non-losslessly, and in which a proxy network is trained for a gradient intractable perceptual metric that evaluates a quality of an output image $\hat{x}$ given an input image x, wherein the computer system is configured to:

(i) receive an input image x from the set of training images and generate one or more images which are derived from x to make a multiscale set of images $\{x_i\}$ which includes x;

(ii) use the image generative network $f_\theta$ to generate an output image $\hat{x}_i$ from an input image $x_i \in \{x_i\}$, without tracking gradients for $f_\theta$;

(iii) use the proxy network to output an approximated function output $\hat{y}_i$, using the $x_i$ and the $\hat{x}_i$ as inputs;

(iv) use the gradient intractable perceptual metric to output a function output $y_i$, using the $x_i$ and the $\hat{x}_i$ as inputs;

(v) evaluate a loss for the proxy network, using the $y_i$ and the $\hat{y}_i$ as inputs, and to include the evaluated loss for the proxy network in a loss array for the proxy network;

(vi) repeat (ii) to (v) for all the images $x_i$ in the multiscale set of images $\{x_i\}$;

(vii) use backpropagation to compute gradients of parameters of the proxy network with respect to an aggregation of the loss array assembled in executions of (v);

(viii) optimize the parameters of the proxy network based on the results of (vii), to provide an optimized proxy network;

(ix) use the image generative network $f_\theta$ to generate an output image $\hat{x}_i$ from an input image $x_i \in \{x_i\}$;

(x) use the optimized proxy network to output an optimized approximated function output $\hat{y}_i$, using the $x_i$ and the $\hat{x}_i$ as inputs;

(xi) evaluate a loss for the generative network $f_\theta$, using the $x_i$, the $\hat{x}_i$ and the optimized approximated function output $\hat{y}_i$ as inputs, and to include the evaluated loss for the generative network $f_\theta$ in a loss array for the generative network $f_\theta$;

(xii) repeat (ix) to (xi) for all the images $x_i$ in the multiscale set of images $\{x_i\}$;

(xiii) use backpropagation to compute gradients of parameters of the generative network $f_\theta$ with respect to an aggregation of the loss array assembled in executions of (xi);

(xiv) optimize the parameters of the generative network $f_\theta$ based on the results of (xiii), to provide an optimized generative network $f_\theta$, and (xv) repeat (i) to (xiv) for each member of the set of training images.

20. A computer-implemented method of training an image generative network $f_\theta$ for a set of training images, in which an output image $\hat{x}$ is generated from an input image x of the set of training images non-losslessly, and in which a proxy network is trained for a gradient intractable perceptual metric that evaluates a quality of an output image $\hat{x}$ given an input image x, the method including the steps of:

(i) the image generative network $f_\theta$ generating an output image $\hat{x}$ from an input image x of the set of training images, without tracking gradients for $f_\theta$;

(ii) the proxy network outputting an approximated function output $\hat{y}$, using x and $\hat{x}$ as inputs;

(iii) the gradient intractable perceptual metric outputting a function output y, using x and $\hat{x}$ as inputs;

(iv) evaluating a loss for the proxy network, using y and $\hat{y}$ as inputs;

(v) using backpropagation to compute gradients of parameters of the proxy network with respect to the loss evaluated in step (iv);

(vi) optimizing the parameters of the proxy network based on the results of step (v), to provide an optimized proxy network;
(vii) the image generative network $f_\theta$ generating an output image $\hat{x}$ from an input image x,
(viii) the optimized proxy network outputting an optimized approximated function output $\hat{y}$, using x and $\hat{x}$ as inputs;
(ix) evaluating a loss for the generative network $f_\theta$, using x, $\hat{x}$ and the optimized approximated function output $\hat{y}$ as inputs;
(x) using backpropagation to compute gradients of parameters of the generative network $f_\theta$ with respect to the loss evaluated in step (ix);
(xi) optimizing the parameters of the generative network $f_\theta$ based on the results of step (x), to provide an optimized generative network $f_\theta$, and
(xii) repeating steps (i) to (xi) for each member of the set of training images.

* * * * *